United States Patent
Mori

(10) Patent No.: US 11,571,924 B2
(45) Date of Patent: Feb. 7, 2023

(54) POSITIONING JIG

(71) Applicant: BROTHER KOGYO KABUSHIKI KAISHA, Nagoya (JP)

(72) Inventor: Hiroki Mori, Toyota (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/375,643

(22) Filed: Jul. 14, 2021

(65) Prior Publication Data

US 2021/0339559 A1 Nov. 4, 2021

Related U.S. Application Data

(63) Continuation of application No. PCT/JP2019/012755, filed on Mar. 26, 2019.

(30) Foreign Application Priority Data

Jan. 16, 2019 (JP) .............................. JP2019-005227

(51) Int. Cl.
*B43L 13/00* (2006.01)
*B05C 1/00* (2006.01)
*B26D 5/00* (2006.01)

(52) U.S. Cl.
CPC ................ *B43L 13/00* (2013.01); *B05C 1/00* (2013.01); *B26D 5/005* (2013.01)

(58) Field of Classification Search
None
See application file for complete search history.

(56) References Cited

U.S. PATENT DOCUMENTS

| 1,460,497 | A | * | 7/1923 | Noble | ..................... B43L 13/00 33/26 |
| 2,312,154 | A | * | 2/1943 | Fischer | ................... B43L 13/00 33/26 |

(Continued)

FOREIGN PATENT DOCUMENTS

| JP | H1-297300 A | 11/1989 |
| JP | H5-2996 U | 1/1993 |

(Continued)

OTHER PUBLICATIONS

International Preliminary Report on Patentability Chapter I dated Jun. 16, 2021, issued for International PCT Application No. PCT/JP2019/012755.

(Continued)

*Primary Examiner* — Jethro M. Pence
(74) *Attorney, Agent, or Firm* — K&L Gates LLP

(57) ABSTRACT

A positioning jig includes a holding portion, a contact portion, and an operating portion. The holding portion holds the cartridge. A portion of the contact portion contacts a writing portion of the pen when the cartridge is held in the holding portion and the pen is held in the accommodating portion. The contact portion is able to rotate with a direction in which an axis of the pen extends as a first rotational axis. The operating portion performs an operation to rotate the contact portion. The contact portion restricts rotation of the pen about the first rotational axis with respect to the contact portion by contacting the writing portion of the pen and positions the pen in a rotational direction about the first rotational axis with respect to the cartridge.

8 Claims, 18 Drawing Sheets

(56) References Cited

U.S. PATENT DOCUMENTS

| | | | | |
|---|---|---|---|---|
| 2,644,423 A * | 7/1953 | Bauer | ............... | D06H 1/02 |
| | | | | 118/247 |
| 2,778,710 A * | 1/1957 | Komas | ............... | B43L 13/00 |
| | | | | 346/139 C |
| 3,020,640 A * | 2/1962 | Graham | ............... | B43L 13/00 |
| | | | | 33/447 |
| 3,120,060 A * | 2/1964 | Graham | ............... | B43L 13/00 |
| | | | | 33/438 |
| 3,136,064 A * | 6/1964 | Brewer | ............... | B43L 13/00 |
| | | | | 33/438 |
| 3,256,607 A * | 6/1966 | Graham | ............... | B43L 13/00 |
| | | | | 33/434 |
| 3,328,883 A * | 7/1967 | Graham | ............... | B43L 13/00 |
| | | | | 33/18.1 |
| 3,431,651 A * | 3/1969 | Graham | ............... | B43L 13/00 |
| | | | | 33/18.1 |
| 3,562,914 A * | 2/1971 | Soe | ............... | B43L 13/00 |
| | | | | 33/23.03 |
| 3,834,027 A * | 9/1974 | Amelon | ............... | B43L 13/00 |
| | | | | 33/27.12 |
| 3,855,707 A * | 12/1974 | Traylor | ............... | B43L 13/00 |
| | | | | 33/24.3 |
| 3,872,596 A * | 3/1975 | Pardubsky | ............... | B43L 13/00 |
| | | | | 33/27.11 |
| 3,988,834 A * | 11/1976 | Anderson | ............... | B43L 13/00 |
| | | | | 118/503 |
| 4,099,330 A * | 7/1978 | Hicks | ............... | B43L 13/00 |
| | | | | 33/18.1 |
| 4,185,389 A * | 1/1980 | Fudro | ............... | B43L 13/00 |
| | | | | 33/21.1 |
| 4,342,528 A * | 8/1982 | Nozu | ............... | B23G 1/16 |
| | | | | 408/11 |
| 4,550,503 A * | 11/1985 | Klawitter | ............... | B43L 13/00 |
| | | | | 346/139 B |
| 4,573,129 A * | 2/1986 | Tribolet | ............... | B43L 13/024 |
| | | | | 346/52 |
| 5,121,140 A * | 6/1992 | Fukumura | ............... | B43K 24/06 |
| | | | | 346/29 |
| 5,383,277 A * | 1/1995 | Shimoda | ............... | B43L 13/00 |
| | | | | 33/18.1 |
| 5,562,452 A * | 10/1996 | Atugi | ............... | B43L 13/00 |
| | | | | 33/18.1 |
| 5,571,322 A * | 11/1996 | Yao | ............... | B43K 23/001 |
| | | | | 33/18.1 |
| 7,171,864 B2 * | 2/2007 | Schmitz | ............... | B43K 7/00 |
| | | | | 73/150 R |
| 7,302,761 B2 * | 12/2007 | Loomis | ............... | B28D 5/0011 |
| | | | | 33/18.1 |
| 9,493,028 B2 * | 11/2016 | Kubota | ............... | B43K 24/06 |
| 2005/0086817 A1 * | 4/2005 | Ramsthaler | ............... | B43L 13/00 |
| | | | | 33/41.4 |
| 2014/0327214 A1 | 11/2014 | Vander Woude | | |
| 2015/0160734 A1 * | 6/2015 | Sugimura | ............... | G06F 3/0346 |
| | | | | 345/179 |
| 2015/0273717 A1 * | 10/2015 | Oka | ............... | B43L 5/00 |
| | | | | 269/289 R |
| 2018/0141371 A1 | 5/2018 | Domen et al. | | |

FOREIGN PATENT DOCUMENTS

| | | |
|---|---|---|
| JP | H10-86593 A | 4/1998 |
| JP | 2017-24118 A | 2/2017 |

OTHER PUBLICATIONS

English translation of International Search Report of International Application No. PCT/JP2019/012755.

* cited by examiner

POSITIONING JIG

CROSS-REFERENCE TO RELATED APPLICATION

This application is a Continuation Application of International Application No. PCT/JP2019/012755, filed Mar. 26, 2019, which claims priority from Japanese Patent Application No. 2019-005227, filed on Jan. 16, 2019. Both of the applications are incorporated herein by reference in their entireties.

BACKGROUND

The present disclosure relates to a positioning jig for positioning a pen fixed to a cartridge.

A cutting device for cutting a sheet-like target object is known. A cutter cartridge to which a cutter is fixed is fitted to the cutting device. The cutting device cuts the target object by moving the cutter cartridge with respect to the target object. Also, the cutting device may also be able to be fitted with a pen cartridge to which a pen is fixed, instead of the cutter cartridge. In this case, the cutting device is able to draw a pattern or a design on the target object with the pen by moving the pen cartridge with respect to the target object.

The pen cartridge has a case, an operating member, and a gripping member. The case has a tubular hollow portion through which a pen is inserted. The operating member can be rotated between a first position and a second position. When the operating member is in the first position, the gripping member is in an open state in which the gripping member does not grip the pen inserted through the tubular hollow portion. On the other hand, when the operating member is in the second position, the gripping member is in a gripping state in which the gripping member grips the pen inserted through the tubular hollow portion. The pen cartridge fixes the position of the pen with respect to the case when the gripping member has been in the gripping state in response to the operating member being rotated.

A positioning jig for positioning a pen fixed to a pen cartridge is known. The procedure when fixing the pen to the pen cartridge with the positioning jig is as follows. The pen cartridge is inserted from the front into a space surrounded by a bottom wall portion, a back wall portion, and side wall portions of the positioning jig. As a result, movement of the pen cartridge in the up-down direction with respect to the positioning jig is restricted. Next, the pen with the tip end thereof pointing downward is inserted from above into the tubular hollow portion of the pen cartridge. The tip end of the pen protrudes downward from the lower end of the tubular hollow portion and abuts against a contact portion corresponding to an upper surface of the bottom wall portion. Next, the operating member of the pen cartridge is rotated from the first position to the second position such that the pen is gripped by the case. As a result, the pen is positioned in an axial direction with respect to the pen cartridge.

SUMMARY

There is a demand to be able to position the pen with respect to the pen cartridge not only in the axial direction of the pen, but also in a rotational direction around the axial direction. For example, when a character or a pattern or the like is to be drawn on a target object in calligraphy while the pen cartridge is fitted to the cutting device, the orientation of the tip end of the pen with respect to the pen cartridge needs to be adjusted appropriately for the writing style. In this case, it becomes necessary to position the pen in the rotational direction with respect to the pen cartridge. However, with the positioning jig described above, it is difficult to position the pen so that the pen faces in the desired rotational direction with respect to the pen cartridge.

The object of the present disclosure is to provide a positioning jig in which a pen can easily be positioned in the rotational direction with respect to a pen cartridge.

Various embodiments herein provide a positioning jig for positioning a pen with respect to a cartridge capable of holding the pen in an accommodating portion. The positioning jig includes a holding portion, a contact portion, and an operating portion. The holding portion holds the cartridge. A portion of the contact portion contacts a writing portion of the pen when the cartridge is held in the holding portion and the pen is held in the accommodating portion. The contact portion is able to rotate with a direction in which an axis of the pen extends as a first rotational axis. The operating portion performs an operation to rotate the contact portion. The contact portion restricts rotation of the pen about the first rotational axis with respect to the contact portion by contacting the writing portion of the pen and positions the pen in a rotational direction about the first rotational axis with respect to the cartridge.

Various embodiments herein also provide a positioning jig for positioning a pen with respect to a cartridge capable of holding the pen in an accommodating portion. The positioning jig includes a scale portion and a positioning. The scale portion has a plurality of markings. The positioning portion holds the scale portion and positioning the scale portion with respect to the cartridge. The plurality of markings are arranged in an arc shape with a direction in which an axis of the pen held in the accommodating portion of the cartridge extends as a center axis.

When the positioning jigs according to the first aspect and the second aspect are used, the user first places the cartridge so that the cartridge is held by the holding portion of the positioning jig. Next, the user places the pen so that the pen is held by the cartridge, and abuts the writing portion of the pen against the contact surface of the contact portion of the positioning jig. As a result, the pen is restricted from rotating around the first rotational axis, so the pen can be positioned in the rotational direction with respect to the cartridge. Note that the user can position the pen with respect to the cartridge so that the pen faces in a desired rotational direction by operating the operating portion and rotating the contact portion. Therefore, the user can easily position the pen in the rotational direction with respect to the cartridge.

BRIEF DESCRIPTION OF THE DRAWINGS

Embodiments of the disclosure will be described below in detail with reference to the accompanying drawings in which.

DETAILED DESCRIPTION OF THE EXEMPLARY EMBODIMENTS

Embodiments embodying the present disclosure will be described in order with reference to the drawings. The drawings to be referenced are used to illustrate the technical features that can be adopted in the present disclosure, and the described structures and the like of the devices are not intended to be limited thereto, but are merely explanatory examples.

Overview of Cutting Device 1A

Figure 1:
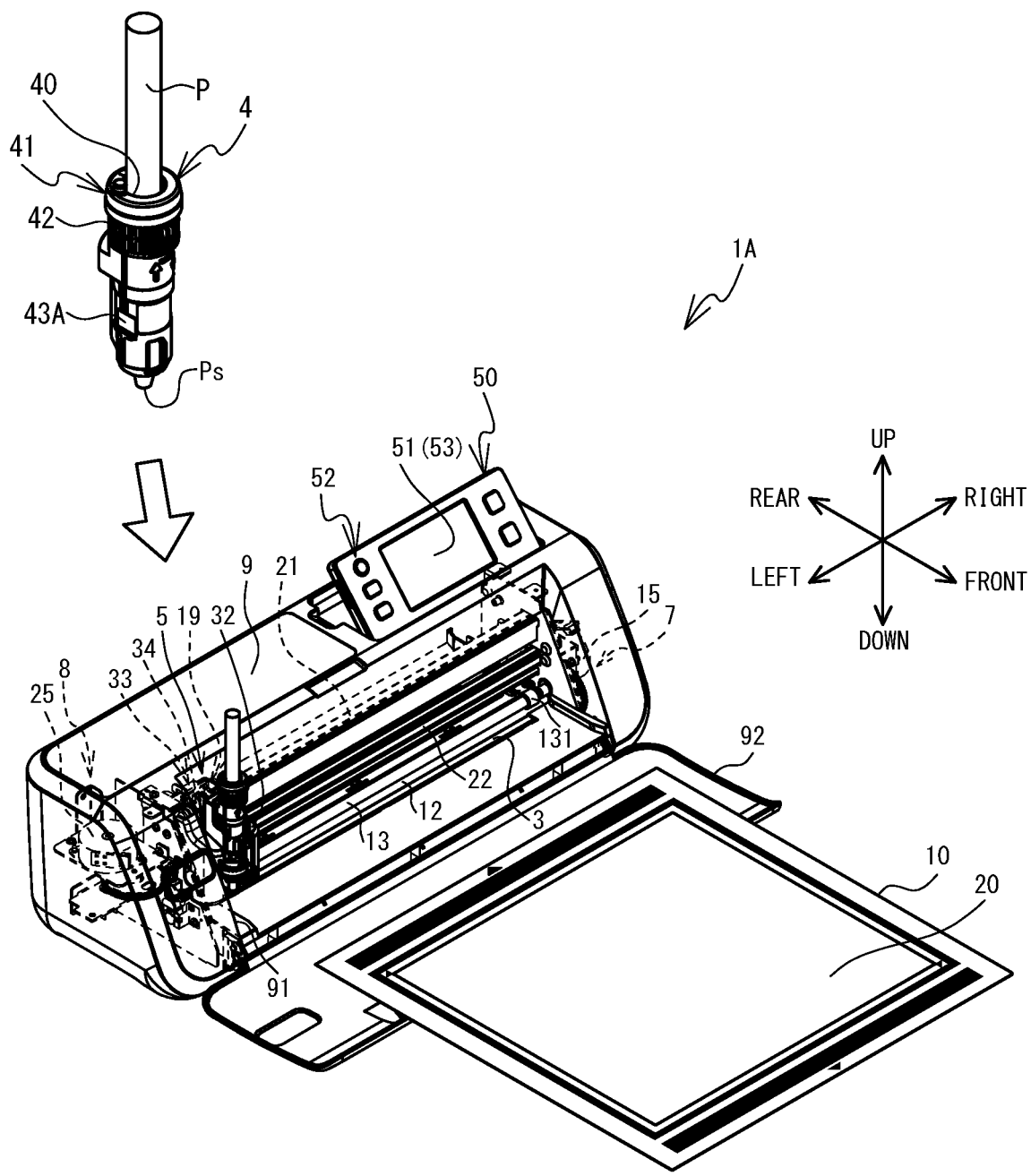
FIG. 1 is a perspective view of a cutting device.

An overview of a cutting device 1A will be described with reference to FIG. 1. The cutting device 1A is used in a state fitted with a cartridge 4 capable of fixing a cutting blade (not shown in the drawings) or a pen P. When the cutting device 1A is fitted with the cartridge 4 to which a cutting blade has been fixed, the cutting device 1A can cut a sheet-like target object 20 using the cutting blade. Also, when the cutting device 1A is fitted with the cartridge 4 to which the pen P has been fixed, the cutting device 1A can draw a character or a pattern (hereinafter collectively referred to as "object") on the target object 20 using the pen P. In the description below, a case is assumed in which the cartridge 4 to which the pen P is fixed is fitted to the cutting device 1A. The lower left side, the upper right side, the lower right side, the upper left side, the upper side, and the lower side in FIG. 1 are the left side, the right side, the front side, the rear side, the upper side, and the lower side, respectively, of the cutting device 1A and the cartridge 4.

The cutting device 1A is provided with a main body cover 9, a platen 3, a head 5, a conveyance portion 7, a movement portion 8, a holder 10, and a control portion (not shown in the drawings). The holder 10 is conveyed in the front-rear direction by the cutting device 1A. The target object 20 is held on the upper surface of the holder 10. The main body cover 9 is a case having a substantially rectangular box shape that is long in the right-left direction. The main body cover 9 is provided with an opening 91, a cover 92, and an operating portion 50. The opening 91 is an opening provided in a front surface portion of the main body cover 9. The cover 92 is a plate-shaped member that is long in the left-right direction. A lower end side of the cover 92 is supported by the main body cover 9 so as to be able to rotate. In FIG. 1, the cover 92 is open such that the opening 91 is open.

The operating portion 50 is provided with a liquid crystal display (LCD) 51, a plurality of operating switches 52, and a touch panel 53. An image including various items such as commands, illustrations, setting values, and messages is displayed on the LCD 51. The touch panel 53 is provided on the surface of the LCD 51. A user performs pressing operations on the touch panel 53 using either a finger or a stylus pen.

The platen 3 is provided inside the main body cover 9. The platen 3 supports the lower surface of the holder 10, and the platen 3 can be placed on which the holder 10 holding the target object 20. The holder 10 is set on the platen 3 while the opening 91 is open.

The head 5 is provided with a carriage 19, a mounting portion 32, and an up-down drive mechanism 33. The mounting portion 32 is able to be fitted with the cartridge 4. The cartridge 4 is fixed to the mounting portion 32 in a state in which a pen tip (hereinafter, referred to as "writing portion Ps") of the pen P is arranged at the lower end. The up-down drive mechanism 33 moves the mounting portion 32 in a direction in which the mounting portion 32 moves toward the platen 3 (i.e., downward) and a direction in which the mounting portion 32 moves away from the platen 3 (i.e., upward). Therefore, the up-down drive mechanism 33 moves the cartridge 4 mounted to the mounting portion 32 in the up-down direction.

The conveyance portion 7 conveys the target object 20 held by the holder 10 in a sub-scanning direction orthogonal to a main scanning direction by conveying the holder 10 in the sub-scanning direction. The main scanning direction and the sub-scanning direction in this example are the left-right direction and the front-rear direction, respectively. The conveyance portion 7 is configured to be able to convey the holder 10 set on the platen 3 in the front-rear direction of the cutting device 1A. The conveyance portion 7 is provided with a driving roller 12, a pinch roller 13, and a Y-axis motor 15.

When the holder 10 is conveyed, the left portion of the holder 10 is sandwiched between the driving roller 12 and the left roller portion (not shown in the drawings) of the pinch roller 13. The outer right portion of the holder 10 is sandwiched between the driving roller 12 and a roller portion 131. When the Y-axis motor 15 is driven forward or in reverse, the rotational motion of the Y-axis motor 15 is transmitted to the driving roller 12. As a result, the holder 10 is conveyed forward or rearward.

The movement portion 8 is configured to be able to move the head 5 in a direction orthogonal to a conveyance direction of the holder 10, i.e., in a X direction. That is, the movement direction of the head 5 is orthogonal to the conveyance direction of the holder 10. The movement portion 8 is provided with a pair of upper and lower guide rails 21 and 22, and an X-axis motor 25, and the like. The guide rails 21 and 22 extend substantially parallel to the pinch roller 13, i.e., in the X direction. The carriage 19 of the head 5 is supported by the guide rails 21 and 22 so as to be able to move in the X direction along the guide rails 21 and 22.

The movement portion 8 moves the cartridge 4 mounted to the mounting portion 32 of the head 5 in the main scanning direction. The movement portion 8 converts the rotational motion of the X-axis motor 25 into motion in the X direction, and transmits this motion to the carriage 19. When the X-axis motor 25 is driven forward or in reverse, the carriage 19 is moved to the left or to the right.

The control portion (not shown in the drawings) controls the conveyance portion 7, the movement portion 8, and the up-down drive mechanism 33 by driving the Y-axis motor 15, the X-axis motor 25, and a Z-axis motor 34 and the like. As a result, the control portion moves the cartridge 4 mounted to the mounting portion 32 and the target object 20 held by the holder 10 relative to one another. As a result, an object is drawn on the target object 20 by the pen P fixed to the cartridge 4.

Cartridge 4

Figure 2:
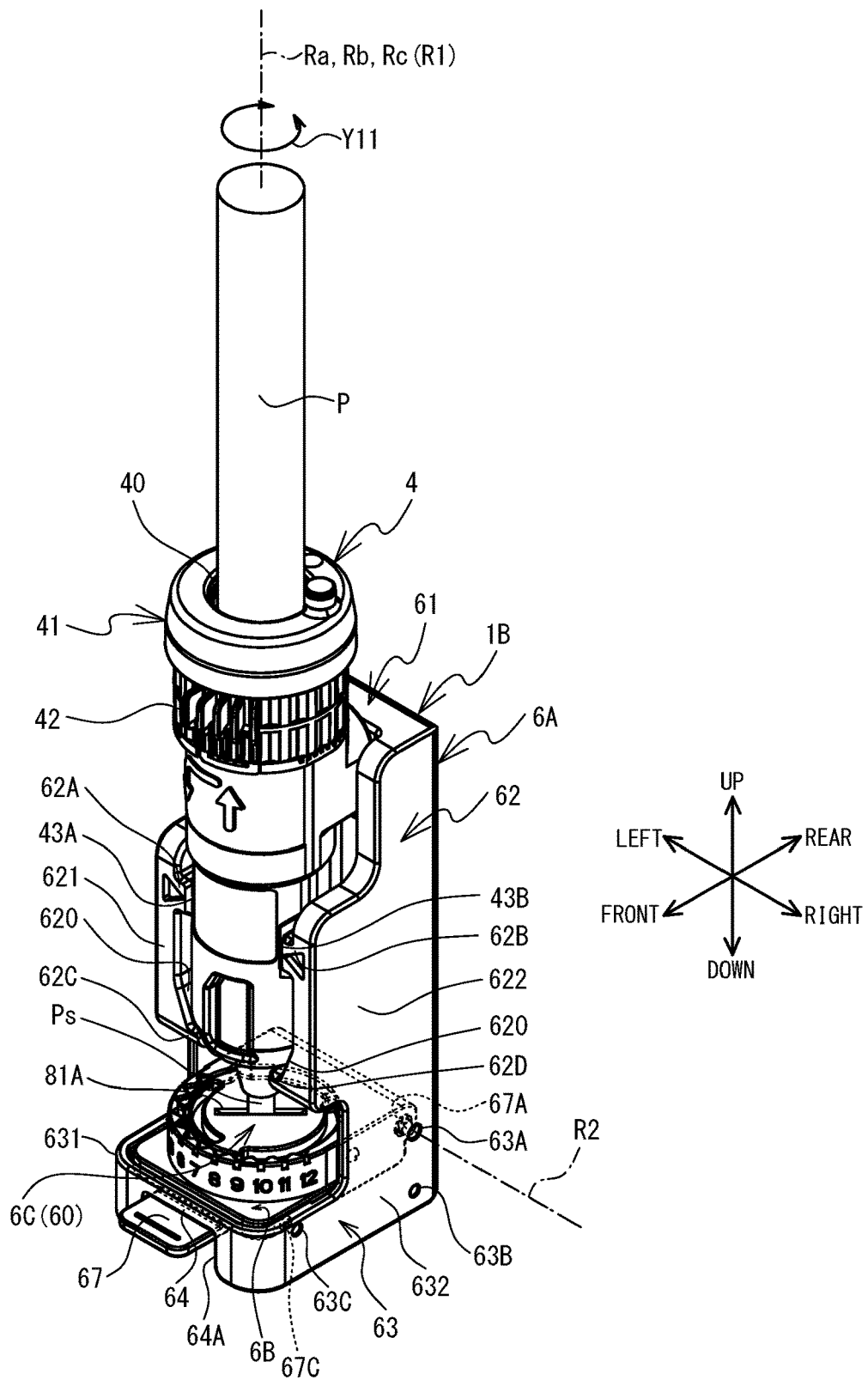
FIG. 2 is a perspective view of a positioning jig to which a cartridge holding a pen is fitted.

The cartridge 4 has a well-known structure disclosed in Japanese Patent Laid-Open Publication No. 2017-24118 A, for example. Hereinafter, an overview of the structure will be described. As shown in FIG. 1 and FIG. 2, the cartridge 4 has a cylindrical base portion 41. A through-hole in the base portion 41 extends in the up-down direction from the upper end to the lower end of the base portion 41, and forms an accommodating portion 40 that holds the pen P. The pen P is inserted downward from the upper end of the accommodating portion 40. The writing portion Ps of the pen P protrudes downward from the lower end of the base portion 41. The base portion 41 has a dial 42 near the upper end. The dial 42 can slide in the up-down direction and rotate about a virtual rotational axis extending in the up-down direction.

The method for attaching/detaching the pen P to/from the cartridge 4 is as follows. In a state in which the pen P is held in the accommodating portion 40, the dial 42 is slide upward, rotated in the clockwise direction when viewed from above, and then slid downward. As a result, the pen P is rendered unable to move with respect to the cartridge 4, so the position of the pen P with respect to the cartridge 4 is fixed. On the other hand, in a state in which the pen P is fixed with respect to the cartridge 4, the dial 42 is slide upward, rotated in counterclockwise when viewed from above, and slid downward. As a result, the pen P becomes unfixed from the cartridge 4, so the pen P is able to move with respect to the cartridge 4.

Recessed portions 43A and 43B (refer to FIG. 2) are provided one each on the left and right sides below the vertical center of the base portion 41. The recessed portion 43A is provided on the left end of the base portion 41 and is recessed toward the right. The recessed portion 43B is provided on the right end of the base portion 41 and is recessed toward the left. Bottom portions of the recessed portions 43A and 43B extend in a straight line in the front-rear direction between the front end and the rear end of the base portion 41.

Drawing an Object in Calligraphy

When an object is to be drawn in calligraphy, a pen P having the writing portion Ps with an elliptical or rectangular cross-sectional shape, a so-called calligraphy pen, may be used. Also, with calligraphy that is realized using such a pen P, the angle of the pen P with respect to the target object 20 when drawing may be specified for each of a classification of the object. Here, the angle of the pen P is the angle in the rotational direction about the axis of the pen P.

Therefore, when drawing an object in calligraphy using the cutting device 1A, the angle at which the pen P is fixed to the cartridge 4 (hereinafter, referred to as "fixed angle") is important. The fixed angle corresponds to the angle in the rotational direction for which the direction in which the axis of the pen P fixed to the cartridge 4 extends is the rotational axis. When attempting to draw an aesthetically pleasing object in calligraphy using the cutting device 1A, the user must appropriately fix the pen P to the cartridge 4 at the fixed angle specified for each classification of the object, and attach this cartridge 4 to the cutting device 1A, and then use the cutting device 1A.

Positioning Jig 1B

Figure 3:
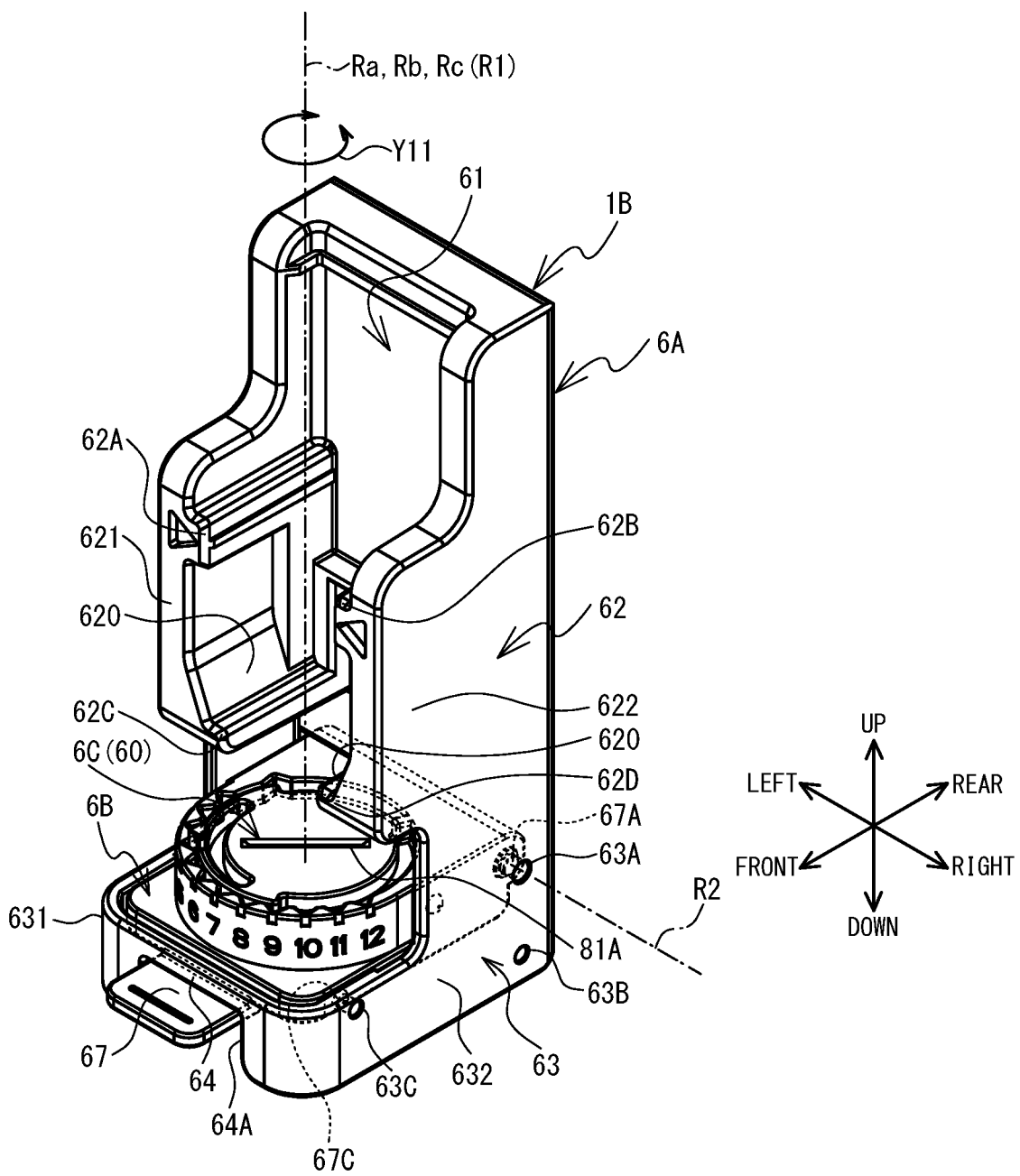
FIG. 3 is a perspective view of the positioning jig.

A positioning jig 1B will now be described with reference to FIG. 2 to FIG. 18. The positioning jig 1B is used to position the pen P in the rotational direction with respect to the cartridge 4 and fix the pen P to the cartridge 4 at a desired fixed angle. In the description below, the lower left side, the upper right side, the lower right side, the upper left side, the upper side, and the lower side in FIG. 2 are the front side, the rear side, the right side, the left side, the upper side, and the lower side, respectively, of the positioning jig 1B. As shown in FIG. 2 and FIG. 3, the positioning jig 1B has a holding portion 6A, a base portion 6B, a contact unit 60 (a contact portion 6C and a operating portion 6D (refer to FIG. 7, etc.)).

Holding Portion 6A

Figure 4:
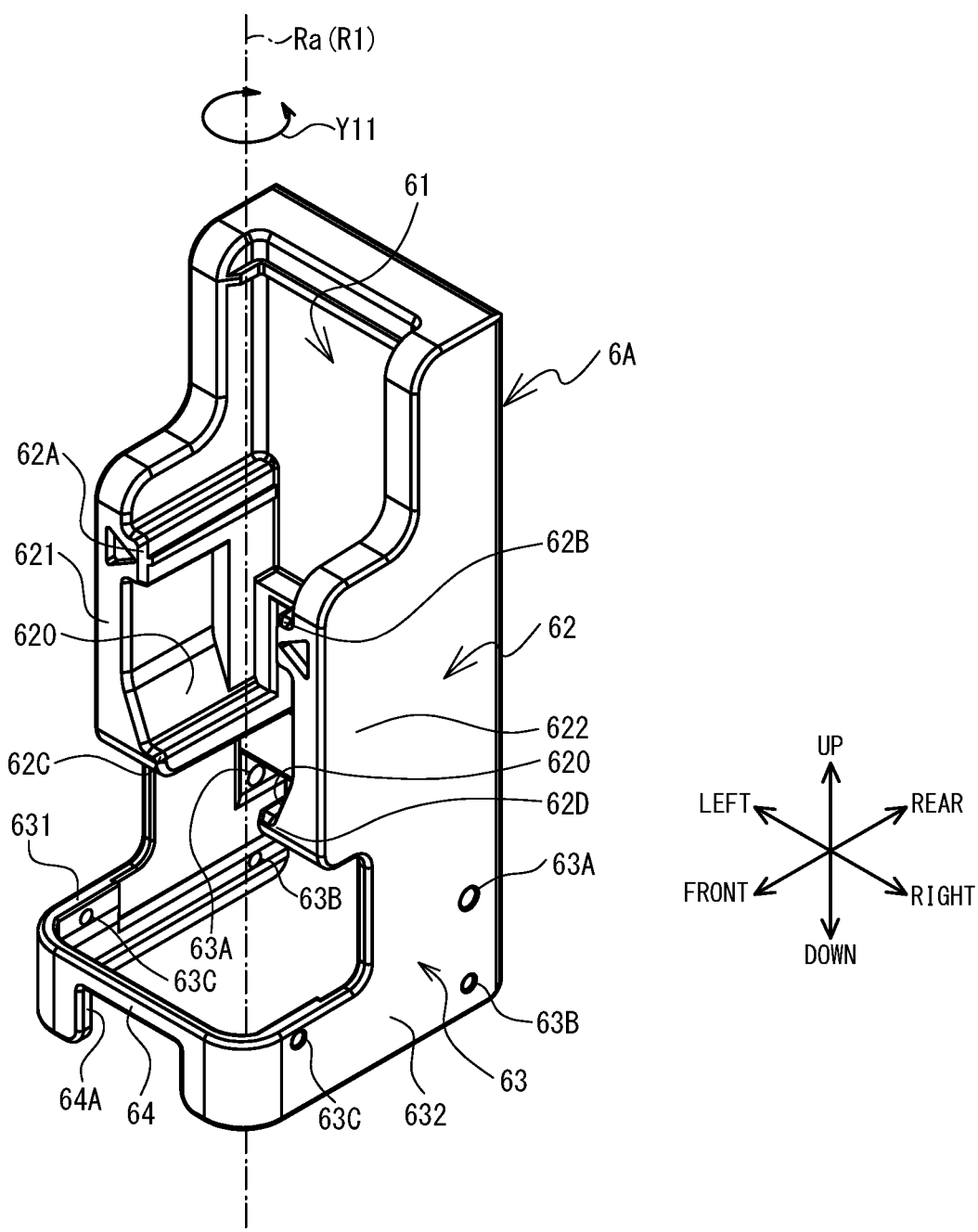
FIG. 4 is a perspective view of a holding portion.

As shown in FIG. 2, the holding portion 6A holds the cartridge 4. Also, as shown in FIG. 3, the holding portion 6A rotatably supports the base portion 6B, described later, at the lower end. Hereinafter, as shown in FIG. 3 and FIG. 4, a virtual straight line extending in the up-down direction in the holding portion 6A is defined as a "first rotational axis Ra". As shown in FIG. 2, the first rotational axis Ra corresponds to the virtual straight line extending along the axis of the pen P held in the accommodating portion 40 of the cartridge 4 while the cartridge 4 is held. The rotational direction about the first rotational axis Ra is defined as a "rotational direction Y11" (refer to FIG. 2). As shown in FIG. 4, the holding portion 6A has frames 61 and 64 and pairs of frames 62 and 63, all of which have a plate shape.

The frame 61 has a substantially rectangular shape that is long in the up-down direction, and is orthogonal to the front-rear direction. The length of the frame 61 in the left-right direction is greater than the length of the base portion 41 (refer to FIG. 2) of the cartridge 4 in the left-right direction.

The pair of frames 62 extend toward the front from both left and right end portions of the frame 61, and are orthogonal to the right-left direction. A portion of the frame 62 on the left side extending to the lower end from substantially the center in the up-down direction protrudes toward the front. Hereinafter, this portion will be referred to as "protruding portion 621". The portion of the frame 62 on the right side extending to the lower end from the center in the up-down direction protrudes toward the front. Hereinafter, this portion will be referred to as "protruding portion 622". The protruding portions 621 and 622 are separated in the left-right direction and face each other. An inclined portion 620 inclined with respect to a direction orthogonal to the left-right direction is formed near a lower end of both the right surface of the protruding portion 621 and the left surface of the protruding portion 622. The distance between the protruding portions 621 and 622 becomes smaller farther downward at the portion where the inclined portion 620 is formed.

A protrusion 62A protruding toward the right is provided near the upper end of the right surface of the protruding portion 621. A protrusion 62C protruding toward the right is provided on the lower end of the right surface of the protruding portion 621. The protrusions 62A and 62C extend in a straight line in the front-rear direction between the front end and the rear end of the protruding portion 621. A protrusion 62B protruding toward the left is provided near the upper end of the left surface of the protruding portion 622. A protrusion 62D protruding toward the left is provided on the lower end of the left surface of the protruding portion 622. The protrusions 62B and 62D extend in a straight line in the front-rear direction between the front end and the rear end of the protruding portion 622. The protrusions 62A and 62B extend parallel and separated from each other in the left-right direction. The protrusions 62C and 62D extend parallel and separated from each other in the left-right direction.

The pair of frames 63 extend downward from the lower end of the pair of frames 62, and are orthogonal to the left-right direction. A pair of through-holes 63A and 63B are formed near the rear end of each of the pair of frames 63. The through-holes 63A and 63B are lined up in the up-down direction. The through-hole 63A is arranged above the through-hole 63B. The lower end portion of the frame 63 on the left side protrudes toward the front. Hereinafter, this portion will be referred to as "protruding portion 631". The lower end portion of the frame 63 on the right side protrudes toward the front. Hereinafter, this portion will be referred to as "protruding portion 632". The protruding portions 631 and 632 are separated in the left-right direction and face each other. A pair of through-holes 63C are formed one near the front end of each of the protruding portions 631 and 632.

The frame 64 extends between the front end portions of the protruding portions 631 and 632. The frame 64 extends in the left-right direction. A recessed portion 64A that is recessed upward is formed in the center in the left-right direction at the lower end of the frame 64.

Base Portion 6B

Figure 5:
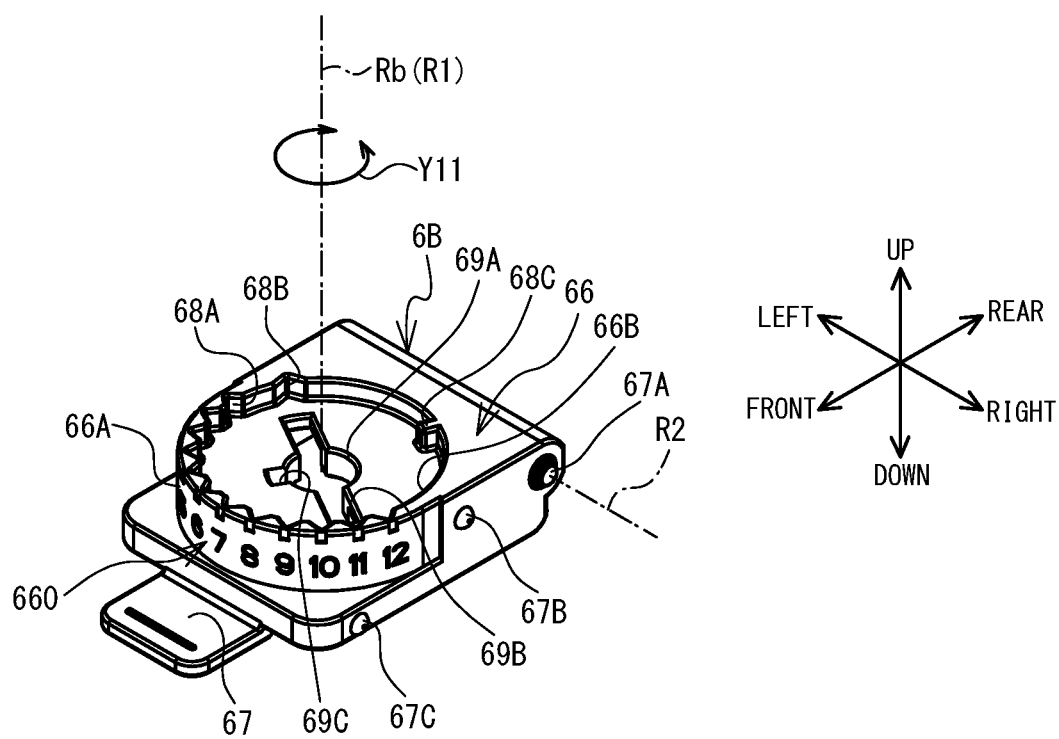
FIG. 5 is a perspective view of a base portion.
Figure 6:
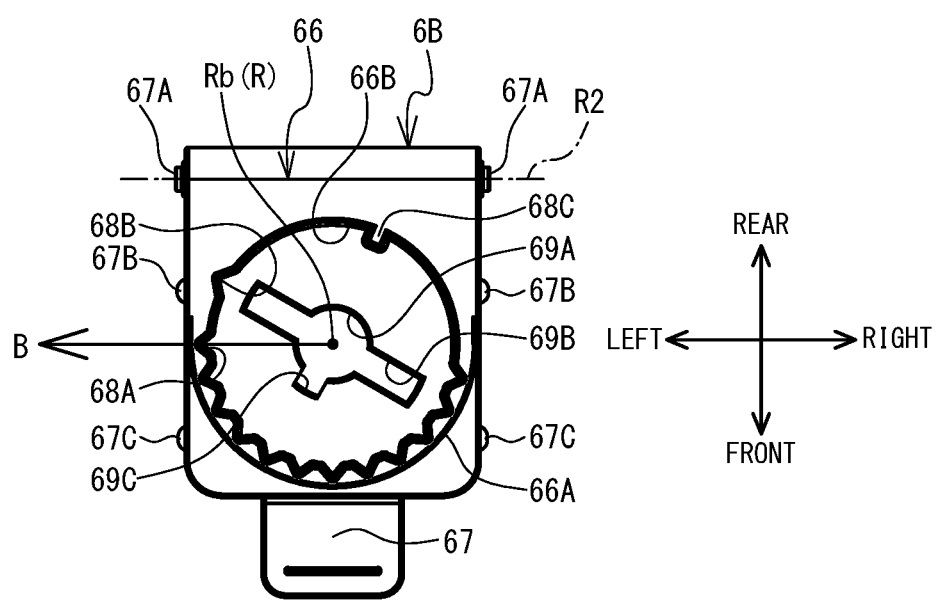
FIG. 6 is a plan view of the base portion.

As shown in FIG. 2 and FIG. 3, the base portion 6B is rotatably supported by the lower end portion of the holding portion 6A. In the description below, unless otherwise specified, a state in which the base portion 6B is held by the holding portion 6A in the position shown in FIG. 2 and FIG. 3 (hereinafter, referred to as "set position") will be assumed, and the directions of the positioning jig 1B will be applied to the base portion 6B. The base portion 6B rotatably supports the contact unit 60, described later. As shown in FIG. 5 and FIG. 6, the base portion 6B is provided with a support 66 and a second restricting portion 67.

The support 66 has a substantially square thick plate shape and is orthogonal to the up-down direction. As shown in FIG. 5, a curved portion 66A is formed on the front side surface of the support 66 by the left and right end portions of a portion, with the exception of the lower end portion, of the front side surface of the support 66 being cut out toward to the rear. The curved portion 66A extends along a portion of a side surface of a virtual cylindrical body centered on a virtual straight line (hereinafter, referred to as "first rotational axis Rb") extending in the up-down direction. More specifically, the curved portion 66A extends along a portion of the substantially front half of the side surface of the cylindrical body. Note that the first rotational axis Rb extends along the axis of the pen P held in the accommodating portion 40 of the cartridge 4 (refer to FIG. 2) held in the holding portion 6A. That is, the positions of the first rotational axes Ra and Rb match. Hereinafter, the rotational direction Y11 centered around the first rotational axis Ra will also apply to the rotational direction centered around the first rotational axis Rb.

A scale portion 660 arranged along the rotational direction Y11 is formed on the curved portion 66A. The scale portion 660 has markings (denoted by marking [1], marking [2], . . . marking [12]) corresponding to numbers "1 to 12". The markings [1] to [12] of the scale portion 660 indicate the angle in the rotational direction Y11 centered on the first rotational axis Rb. More specifically, angle K corresponding to marking [N] (N=1, 2, . . . 12) of the scale portion 660 is calculated by K=N×15−15 (units: °). Note that, as described above, the curved portion 66A is arranged along a portion of a virtual cylindrical body centered on the first rotational axis Rb. Therefore, the scale portion 660 arranged in the rotational direction Y11 along the curved portion 66A is arranged in an arc shape centered on the first rotational axis Rb.

A depressed portion 66B depressed downward is provided on an upper surface of the support 66. A bottom surface of the depressed portion 66B has a substantially circular shape centered on the first rotational axis Rb. A portion of a side wall of the depressed portion 66B that is to the front side of the center in the front-rear direction extends along the curved portion 66A. A plurality of recesses 68A, a recess 68B, and a protrusion 68C are provided on the side wall of the depressed portion 66B.

The plurality of recesses 68A are provided in a portion of the side wall of the depressed portion 66B that extends along the curved portion 66A. The plurality of recesses 68A are recessed outward in the radial direction centered on the first rotational axis Rb. The width of each of the plurality of recesses 68A becomes smaller toward the bottom. The bottom of each of the recesses 68A is pointed.

The recesses 68A correspond one-to-one with the markings [1] to [12] of the scale portion 660 formed on the curved portion 66A. As shown in FIG. 6, when viewed from above, a virtual reference direction B extending in a straight line to the left from the first rotational axis Rb is defined. In this case, the recess 68A corresponding to marking [1] of the scale portion 660 is arranged in the reference direction B with respect to the first rotational axis Rb. Also, each of the recesses 68A corresponding to a marking [N] of the scale portion 660 is arranged in a direction in which the reference direction B has been rotated counterclockwise by N×15-15 (units: °) from the last marking [N] about the first rotational axis Rb when viewed from above.

As shown in FIG. 5 and FIG. 6, the recess 68B is provided at a position to the rear left in the side wall of the depressed portion 66B. The recess 68B is recessed outward in the radial direction centered on the first rotational axis Rb. The width of the recess 68B becomes smaller toward the bottom. The bottom of the recess 68B is pointed. The protrusion 68C is provided at a position to the rear right on the side wall of the depressed portion 66B. The protrusion 68C protrudes inward in the radial direction centered on the first rotational axis Rb.

Through-holes 69A, 69B, and 69C that pass through in the up-down direction are provided in the bottom surface of the depressed portion 66B. The through-hole 69A has a circular shape and extends in the up-down direction along the first rotational axis Rb. The through-hole 69B is a long hole having a rectangular shape. The through-hole 69B extends diagonally forward to the right and diagonally rearward to the left from the through-hole 69A to near the side wall of the depressed portion 66B. The through-hole 69C has a rectangular shape. The through-hole 69C extends diagonally forward to the left from the through-hole 69A. The length from the first rotational axis Rb to the tip end of the through-hole 69C is shorter than the length from the first rotational axis Rb to the tip end of the through-hole 69B.

The second restricting portion 67 is provided on a front end portion of the lower surface of the support 66. The second restricting portion 67 has a plate shape and is orthogonal to the up-down direction. The second restricting portion 67 protrudes forward from the front end portion of the support 66. The length of the second restricting portion 67 in the left-right direction is shorter than the length of the support 66 in the left-right direction.

Pairs of protrusions 67A, 67B, and 67C are provided one of each pair on each of the left and right side surfaces of the support 66. The pair of protrusions 67A protrude from a rear end portion on both the left and right side surfaces of the support 66. The pair of protrusions 67B protrude from portions in front of the pair of protrusions 67A on both the left and right side surfaces of the support 66. The pair of protrusions 67C protrude from a front end portion on both the left and right side surfaces of the support 66. A virtual line that extends in the left-right direction through the pair of protrusions 67A will be referred to as "second rotational axis R2".

Contact Unit 60 (Contact Portion 6C and Operating Portion 6D)

Figure 7:
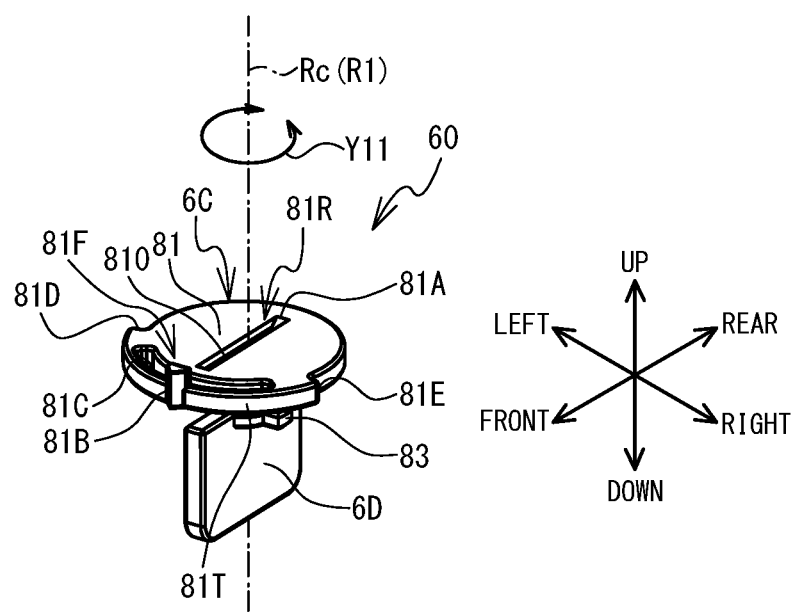
FIG. 7 is a perspective view of a contact unit.

As shown in FIG. 7, the contact unit 60 has the contact portion 6C and the operating portion 6D. As shown in FIG. 2 and FIG. 3, the contact unit 60 is rotatably supported by the base portion 6B. In the description below, the upper left side, the lower right side, the lower left side, the upper right side, the upper side, and the lower side of FIG. 7 are the left side, the right side, the front side, the rear side, the upper side, and the lower side, respectively, of the contact unit 60. In this case, the up-down direction of the contact unit 60 matches the up-down direction of the positioning jig 1B when the base portion 6B is held by the holding portion 6A in the set position. As shown in FIG. 2, the contact portion 6C positions the pen P in the rotational direction Y11 with respect to the cartridge 4 by abutting against the writing portion Ps of the pen P and thereby restricting rotation of the pen P in the rotational direction Y11. The operating portion 6D (refer to FIG. 7) is operated when rotating the contact portion 6C with respect to the base portion 6B. As shown in FIG. 7 to FIG. 10, the contact portion 6C has a contact body 81, an insertion portion 82, and a first restricting portion 83.

The contact body 81 has a substantially circular shape centered on a virtual straight line (hereinafter, referred to as "first rotational axis Rc") extending in the up-down direction. The shape of the contact body 81 is substantially the same as the shape of the bottom surface of the depressed portion 66B provided on the support 66 of the base portion 6B. Note that the first rotational axis Rc extends along the axis of the pen P held in the accommodating portion 40 of the cartridge 4 (refer to FIG. 2) held by the holding portion 6A, when the contact portion 6C is supported by the base portion 6B. That is, the positions of the first rotational axes Ra (refer to FIG. 4), Rb (refer to FIG. 5), and Rc (refer to FIG. 7) all match. Hereinafter, the rotational direction Y11 about the first rotational axes Ra and Rb will also be applied to the rotational direction about the first rotational axis Rc. Unless otherwise specified, the first rotational axes Ra, Rb, and Rc will collectively be referred to as "first rotational axis R1".

Figure 8:
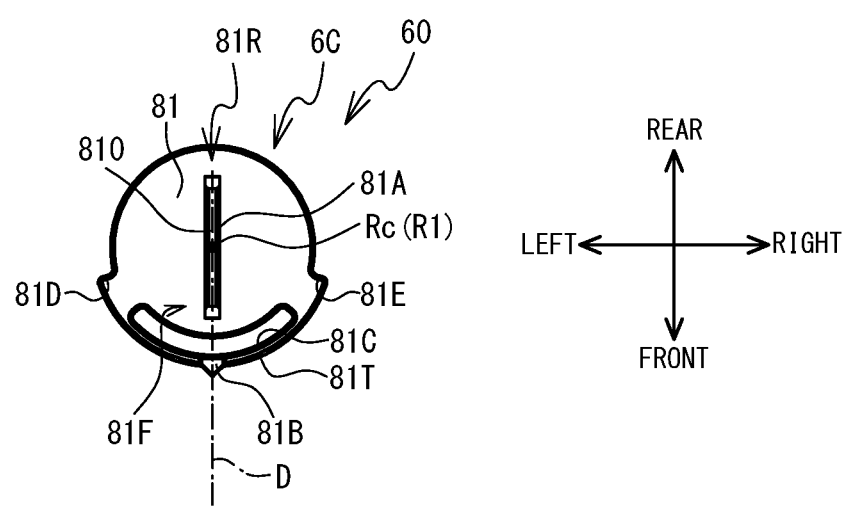
FIG. 8 is a plan view of the contact unit.

As shown in FIG. 8, the contact body 81 has two portions of different diameters: a large diameter portion 81F and a small diameter portion 81R. The large diameter portion 81F is positioned on the front side of substantially the center in the front-rear direction of the contact body 81. The small diameter portion 81R is positioned on the rear side of substantially the center in the front-rear direction of the contact body 81. The large diameter portion 81F has a larger diameter than the small diameter portion 81R. Steps 81D and 81E are formed on the side surface of the contact body 81 at boundary portions between the large diameter portion 81F and the small diameter portion 81R. The step 81D is formed near the left end portion of the side surface of the contact body 81. The step 81E is formed near the right end portion of the side surface of the contact body 81.

As shown in FIG. 7 and FIG. 8, a recess 81A extending in a straight line through the first rotational axis Rc is provided on an upper surface of the contact body 81. The recess 81A extends in the horizontal direction. The writing portion Ps (refer to FIG. 2) is inserted into the recess 81A while the cartridge 4 holding the pen P is held by the holding portion 6A. At this time, the writing portion Ps contacts the bottom surface and the inside wall surface (hereinafter referred to as "contact surface 810") of the recess 81A.

A long hole 81C extending in an arc shape while curving along the side surface of the large diameter portion 81F is provided in a front end portion of the contact body 81. The portion of the large diameter portion 81F that includes the side surface on the front side and is arranged on the front side of the long hole 81C will be referred to as "support portion 81T". The support portion 81T extends curving between the steps 81D and 81E. The support portion 81T elastically deforms in response to force acting toward the first rotational axis Rc.

A protrusion 81B is provided in the center in the left-right direction of the support portion 81T. The protrusion 81B protrudes forward and upward with respect to the support portion 81T (refer to FIGS. 7 and 9). The width of the protrusion 81B in the left-right direction becomes smaller toward the tip end. The tip end of the protrusion 81B is pointed. As shown in FIG. 8, the protrusion 81B overlaps with a virtual straight line D extending horizontally along the recess 81A.

Figure 9:
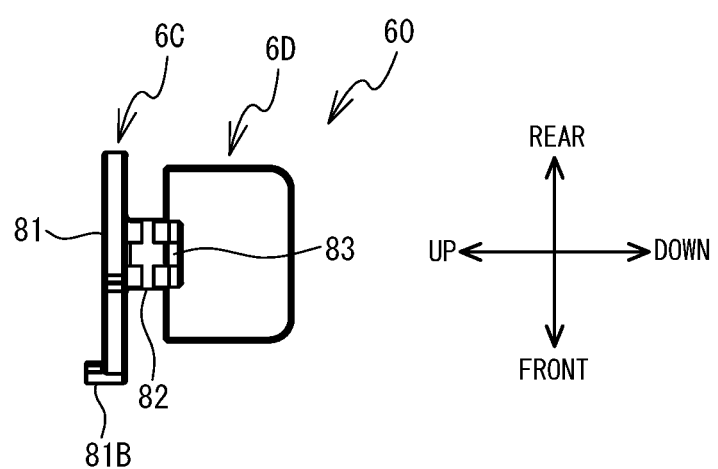
FIG. 9 is a right side view of the contact unit.
Figure 10:
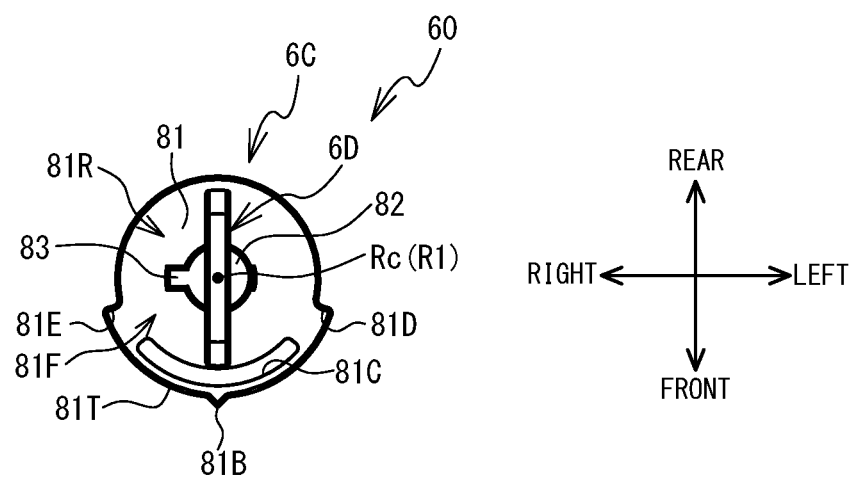
FIG. 10 is a bottom view of the contact unit.

As shown in FIG. 9 and FIG. 10, the insertion portion 82 is provided on a lower surface of the contact body 81 and protrudes downward. The insertion portion 82 has a substantially cylindrical shape (refer to FIG. 10). The insertion portion 82 extends along the first rotational axis Rc. The diameter of the insertion portion 82 is slightly smaller than the diameter of the through-hole 69A (refer to FIG. 5 and FIG. 6) in the base portion 6B.

As shown in FIG. 7, FIG. 9, and FIG. 10, the first restricting portion 83 is provided on a lower end portion of the insertion portion 82. The first restricting portion 83 has a rectangular plate shape and is orthogonal to the up-down direction. The first restricting portion 83 protrudes toward the right from the insertion portion 82 at a position separated downward from the contact body 81 (refer to FIG. 7). The distance between the contact body 81 and the first restricting portion 83 is slightly greater than the width in the up-down direction of the portion where the depressed portion 66B is formed on the support 66 of the base portion 6B (refer to FIG. 5).

The operating portion 6D is provided on the lower end portion of the insertion portion 82. The operating portion 6D has a rectangular plate shape and is orthogonal to the left-right direction. The sectional shape when the operating portion 6D is cut on a virtual plane orthogonal to the up-down direction is slightly smaller than the through-hole 69B in the base portion 6B (refer to FIG. 5).

Assembling the Contact Unit 60 to the Base Portion 6B

A method for assembling the contact unit 60 to the base portion 6B will now be described with reference to FIG. 11 to FIG. 16. First, the contact unit 60 (refer to FIG. 7) is placed above the base portion 6B (refer to FIG. 5). At this time, the respective positions are adjusted such that the first rotational axis Rb of the base portion 6B and the first rotational axis Rc of the contact portion 6C match. Also, the contact unit 60 is rotated about the first rotational axis Rc with respect to the base portion 6B (refer to FIG. 13) such that the through-hole 69B provided in the bottom surface of the depressed portion 66B of the base portion 6B and the operating portion 6D of the contact unit 60 overlap in the up-down direction. At the same time, the through-hole 69A provided in the bottom surface of the depressed portion 66B of the base portion 6B and the insertion portion 82 of the contact unit 60 overlap in the up-down direction (refer to FIG. 13). Also, the through-hole 69C provided in the bottom surface of the depressed portion 66B of the base portion 6B and the first restricting portion 83 of the contact unit 60 overlap in the up-down direction (refer to FIG. 13). Furthermore, the recess 68B provided on the side wall of the depressed portion 66B of the base portion 6B and the protrusion 81B of the contact portion 6C overlap in the up-down direction (refer to FIG. 12).

Figure 13:
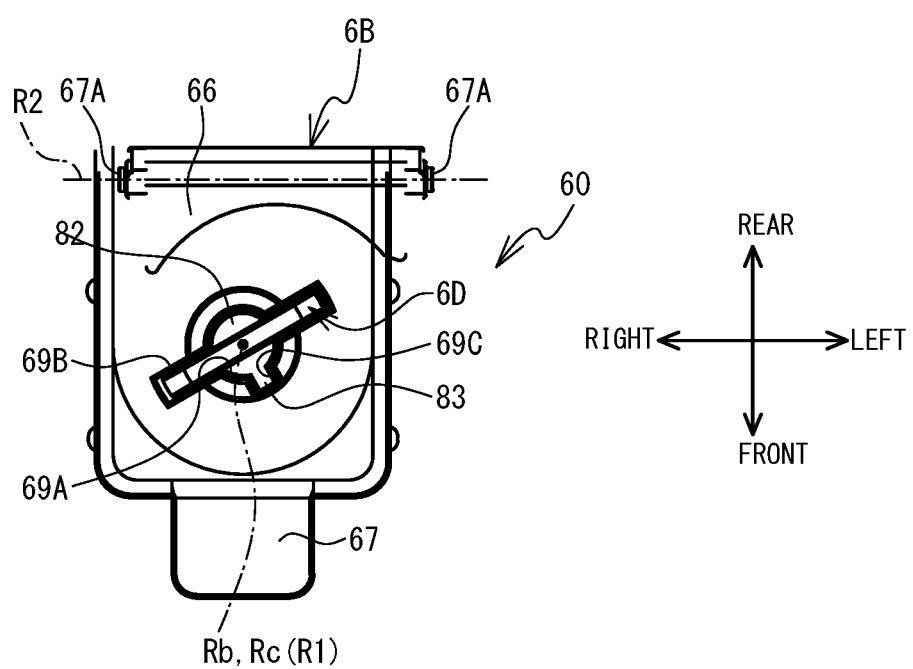
FIG. 13 is a bottom view illustrating the state in which the contact unit is assembled to the base portion.

The contact unit 60 is brought closer to the base portion 6B from above. As shown in FIG. 13, the operating portion 6D of the contact unit 60 enters the through-hole 69B in the base portion 6B from above and passes through the through-hole 69B downward. Next, the first restricting portion 83 of the contact unit 60 enters the through-hole 69C in the base portion 6B from above and passes through the through-hole 69C downward. Next, the insertion portion 82 of the contact unit 60 enters the through-hole 69A in the base portion 6B from above. Downward movement of the contact unit 60 with respect to the base portion 6B is restricted by the lower surface of the contact body 81 of the contact portion 6C contacting the lower surface of the depressed portion 66B of the base portion 6B from above (refer to FIG. 11).

Figure 11:
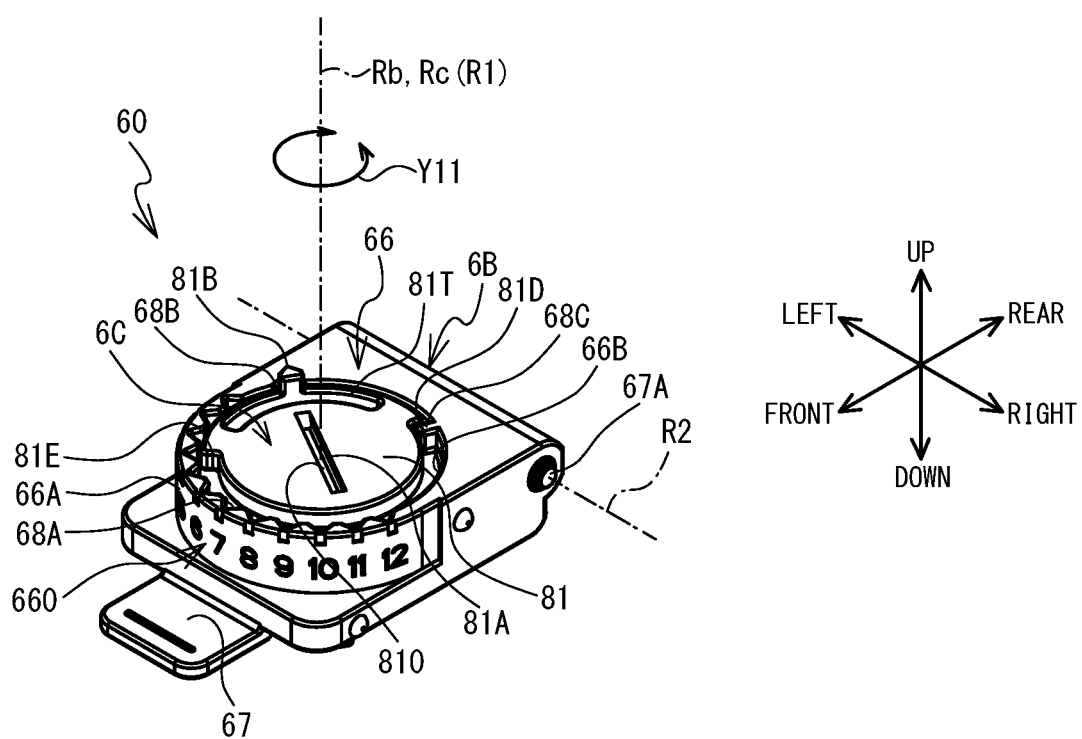
FIG. 11 is a perspective view illustrating a state in which the contact unit is assembled to the base portion.
Figure 12:
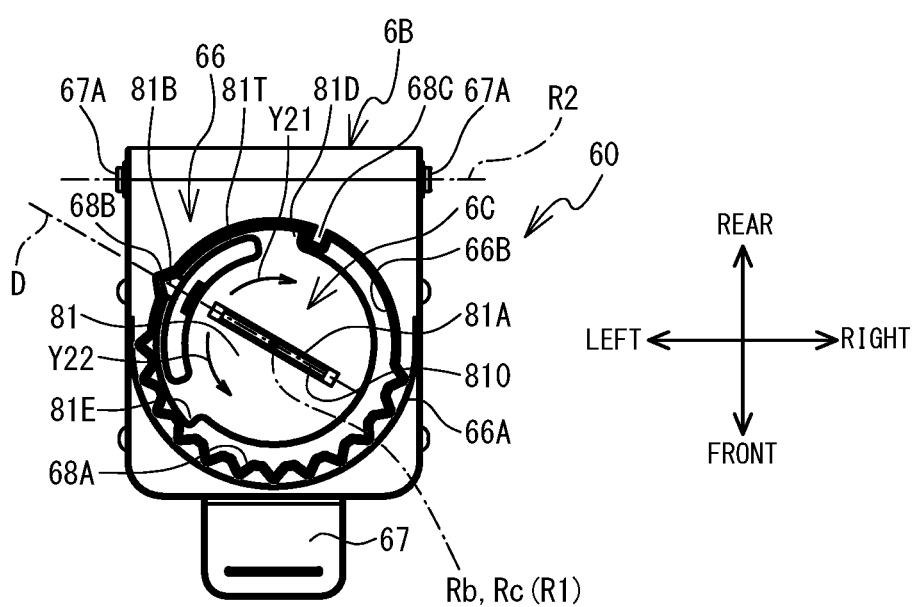
FIG. 12 is a plan view illustrating the state in which the contact unit is assembled to the base portion.

As shown in FIG. 11 to FIG. 13, the protrusion 81B of the contact portion 6C engages from above with the recess 68B provided in the side wall of the depressed portion 66B of the base portion 6B (refer to FIG. 11 and FIG. 12). The step 81D of the contact portion 6C comes close to the left side of the protrusion 68C provided on the side wall of the depressed portion 66B of the base portion 6B (refer to FIG. 11 and FIG. 12). The insertion portion 82 of the contact unit 60 is inserted through the through-hole 69A in the base portion 6B (refer to FIG. 13). The first restricting portion 83 and the operating portion 6D of the contact unit 60 are arranged below the bottom surface of the support 66 of the base portion 6B (refer to FIG. 13).

For example, suppose the user applies a force to the contact unit 60 to rotate the contact unit 60 in a clockwise direction Y21 (refer to FIG. 12) about the first rotational axes Ra and Rb when viewed from above by operating the operating portion 6D. However, rotation of the contact unit 60 with respect to the base portion 6B is inhibited by the step 81D of the contact portion 6C contacting the protrusion 68C of the base portion 6B, as shown in FIG. 12.

On the other hand, for example, suppose the user applies a force to the contact unit 60 to rotate the contact unit 60 in a counterclockwise direction Y22 (refer to FIG. 12) about the first rotational axes Ra and Rb when viewed from above by operating the operating portion 6D. In this case, the protrusion 81B of the contact portion 6C contacts the recess 68B of the depressed portion 66B of the base portion 6B, and receives force toward the inside in the radial direction centered on the first rotational axis Rb. The support portion 81T of the contact portion 6C elastically deforms in response to the protrusion 81B moving inward in the radial direction in response to this force. The protrusion 81B comes out of the recess 68B of the depressed portion 66B of the base portion 6B. The support portion 81T applies, to the protrusion 81B, force toward the outside in the radial direction centered on the first rotational axis Rb.

The contact unit 60 rotates in the counterclockwise direction Y22 about the first rotational axis Rb until the protrusion 81B of the contact portion 6C reaches the position of the recess 68A corresponding to marking [1] of the scale portion 660, from among the plurality of recesses 68A of the depressed portion 66B of the base portion 6B. When the protrusion 81B of the contact portion 6C reaches the position of the recesses 68A corresponding to the marking [1] of the base portion 6B, the protrusion 81B moves outward in the radial direction centered on the first rotational axis Rb by the elastic force received from the support portion 81T. The protrusion 81B of the contact portion 6C engages with the recess 68A corresponding to the marking [1] of the base portion 6B.

Figure 14:
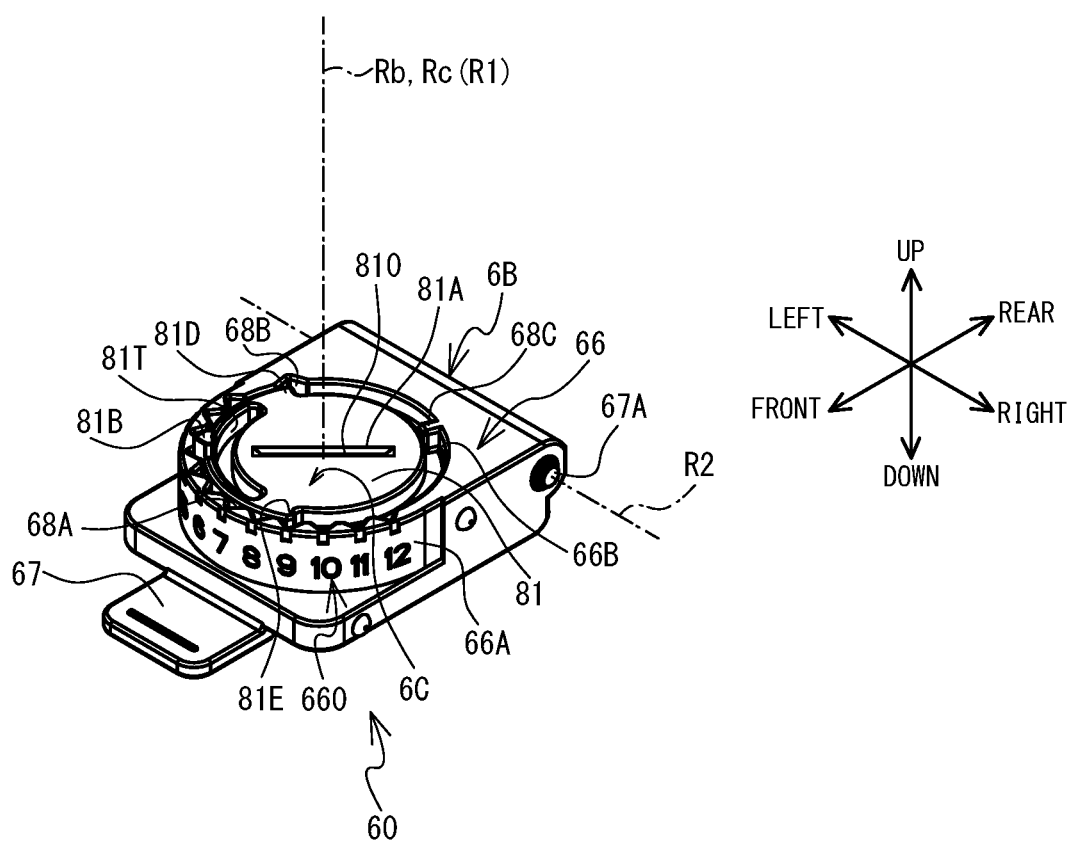
FIG. 14 is a perspective view illustrating a state in which the contact unit is rotated with respect to the base portion.
Figure 15:
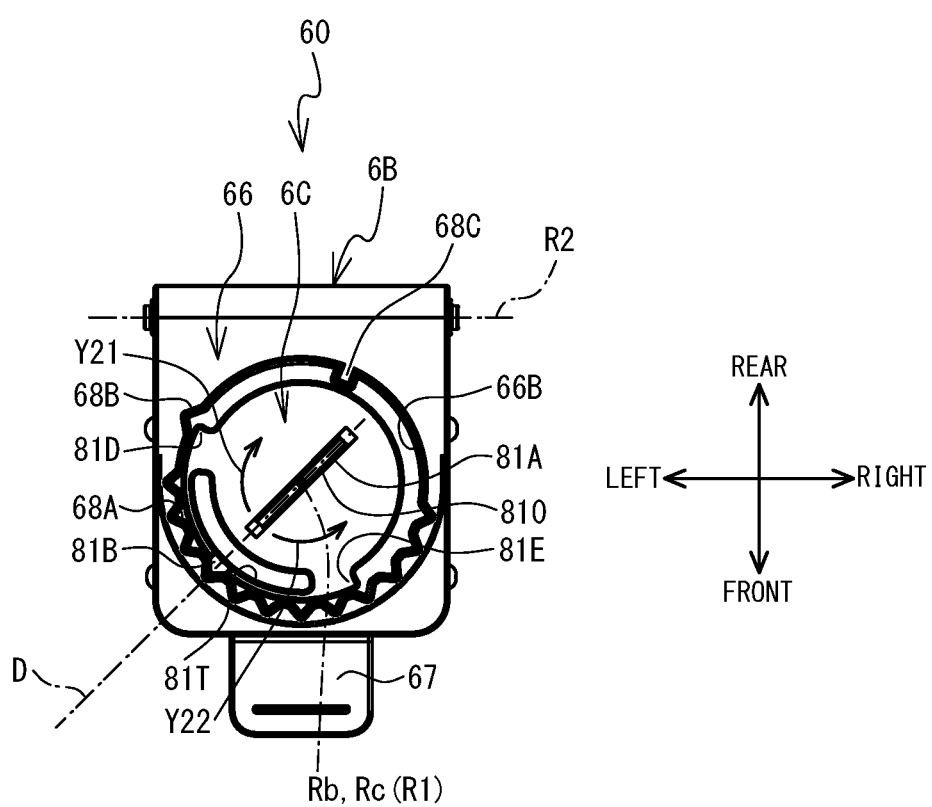
FIG. 15 is a plan view illustrating the state in which the contact unit is rotated with respect to the base portion.
Figure 16:
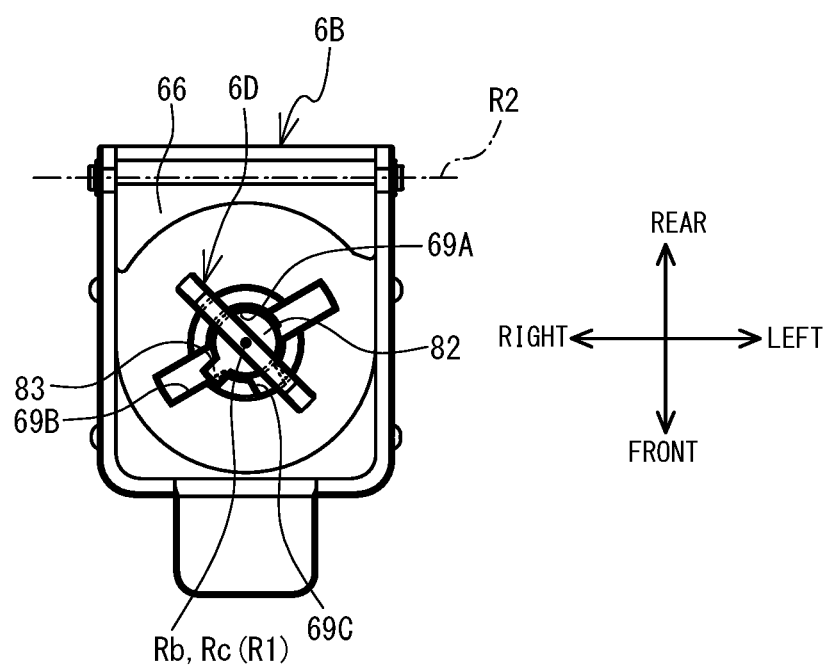
FIG. 16 is a bottom view illustrating the state in which the contact unit is rotated with respect to the base portion.

Moreover, suppose that a force causing the contact unit 60 to rotate in the counterclockwise direction Y22 (refer to FIG. 12) repeatedly acts on the contact unit 60 by the user operating the operating portion 6D. In this case, the protrusion 81B of the contact portion 6C repeatedly engages/disengages to/from the plurality of recesses 68A of the base portion 6B. The contact unit 60 rotates in increments of 15° in the counterclockwise direction Y22 (refer to FIG. 12) while the protrusion 81B sequentially engages with the recesses 68A corresponding to the marking [2], the marking [3], and the marking [4] . . . of the base portion 6B. FIG. 14 to FIG. 16 show a state in which the protrusion 81B of the contact portion 6C is engaged with the recess 68A corresponding to the marking [4] of the base portion 6B. At this time, the virtual straight line D extending horizontally along the recess 81A passes through the recess 68A corresponding to the marking [4] of the base portion 6B.

As shown in FIG. 16, the through-hole 69C in the base portion 6B and the first restricting portion 83 of the contact unit 60 will no longer overlap in the up-down direction in response to the contact unit 60 rotating with respect to the base portion 6B. Therefore, the insertion portion 82 of the contact unit 60 is restricted from coming out of the through-hole 69A in the base portion 6B, and the operating portion 6D of the contact unit 60 is restricted from coming out of the through-hole 69B in the base portion 6B, by the first restricting portion 83.

An example in which the protrusion 81B of the contact portion 6C is engaged with the recess 68A corresponding to the marking [12] of the base portion 6B will now be given. In this case, the step 81E of the contact portion 6C comes close to the right side of the protrusion 68C of the depressed portion 66B of the base portion 6B. For example, suppose that the user applies a force to the contact unit 60 causing the contact unit 60 to rotate in the counterclockwise direction Y22 (refer to FIG. 15) about the first rotational axes Ra and Rb when viewed from above by operating the operating portion 6D. However, rotation of the contact unit 60 with respect to the base portion 6B is inhibited by the step 81E of the contact portion 6C contacting the protrusion 68C of the base portion 6B.

Assembling the Base Portion 6B to the Holding Portion 6A

A method for assembling the base portion 6B to the holding portion 6A will now be described with reference to FIG. 3 and FIG. 17. As shown in FIG. 3, the pair of protrusions 67A of the base portion 6B are inserted from the inside into the pair of through-holes 63A in the holding portion 6A. The pair of protrusions 67C of the base portion 6B are inserted from the inside into the pair of through-holes 63C in the holding portion 6A. The second restricting portion 67 of the base portion 6B is arranged inside the recessed portion 64A of the frame 64 of the holding portion 6A. The base portion 6B is arranged in the set position. At this time, the positions of the first rotational axis Rb of the base portion 6B, the first rotational axis Rc of the contact portion 6C, and the first rotational axis Ra of the holding portion 6A all match. Hereinafter, the position of the contact portion 6C when the base portion 6B is arranged in the set position will be referred to as "first position". The contact portion 6C intersects the first rotational axis R1 when arranged in the first position.

The pair of protrusions 67A of the base portion 6B are rotatably supported with respect to the pair of through-holes 63A in the holding portion 6A. The base portion 6B is able to rotate about the second rotational axis R2 that extends in the left-right direction along the pair of protrusions 67A when the pair of protrusions 67C come out of the pair of through-holes 63C in the holding portion 6A. The second rotational axis R2 extends in a direction intersecting the first rotational axis R1.

Figure 17:
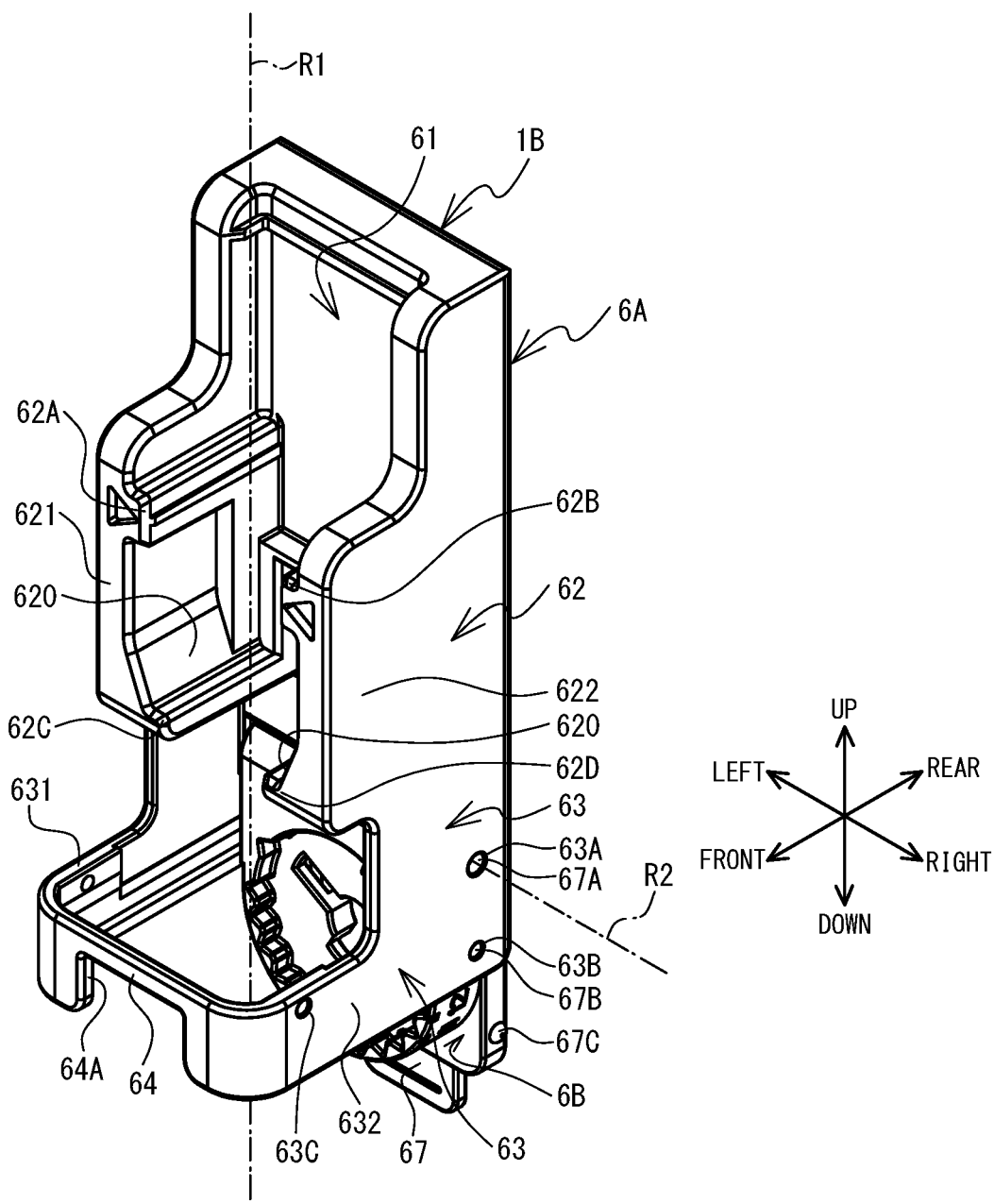
FIG. 17 is a perspective view illustrating a state in which the base portion is rotated with respect to the holding portion.

FIG. 17 shows a state in which the base portion 6B has been rotated 90 degrees counterclockwise when viewed from the right, from the state in which the base portion 6B was arranged in the set position (refer to FIG. 3). Note that the contact unit 60 is omitted in FIG. 17. The pair of protrusions 67B of the base portion 6B are inserted from the inside through the pair of through-holes 63B in the holding portion 6A. Hereinafter, the position of the base portion 6B in this state will be referred to as "detach position". When the base portion 6B is arranged in the detach position, the contact portion 6C does not intersect the first rotational axis R1 of the holding portion 6A, but is arranged to the rear of the first rotational axis R1. Hereinafter, the position of the contact portion 6C when the base portion 6B is arranged in the detach position will be referred to as "second position". The contact portion 6C moves between the first position (refer to FIG. 3) and the second position (refer to FIG. 17) in response to the base portion 6B rotating between the set position (refer to FIG. 3) and the detach position (refer to FIG. 17) with respect to the holding portion 6A.

On the other hand, for example, suppose that the user attempts to rotate the base portion 6B in the clockwise direction when viewed from the right while the base portion 6B is arranged in the set position (refer to FIG. 3) and the contact portion 6C is arranged in the first position. This in other words corresponds to an attempt to rotate the contact portion 6C arranged in the first position to the side opposite the second position. In this case, the second restricting portion 67 of the base portion 6B comes into contact with the recessed portion 64A of the frame 64 of the holding portion 6A from below, thus preventing the base portion 6B from rotating. Therefore, the second restricting portion 67 prevents the contact portion 6C from rotating from the first position to the side opposite the second position.

Positioning the Pen P with Respect to the Cartridge 4

The positioning jig 1B (refer to FIG. 3) in a state with the base portion 6B arranged in the set position and the contact portion 6C arranged in the first position is prepared. The fixed angle of the pen P according to the classification of the object is specified by the user. The user further converts the specified fixed angle to one of the markings [1] to [12] of the scale portion 660 of the positioning jig 1B and specifies the marking. The user rotates the contact portion 6C by operating the operating portion 6D of the positioning jig 1B such that the protrusion 81B of the contact portion 6C engages with the recess 68A of the base portion 6B corresponding to the specified marking. In this case, the protrusion 81B of the contact portion 6C functions as a marker indicating the relative positional relationship of the contact portion 6C and the markings [1] to [12] of the base portion 6B.

Figure 18:
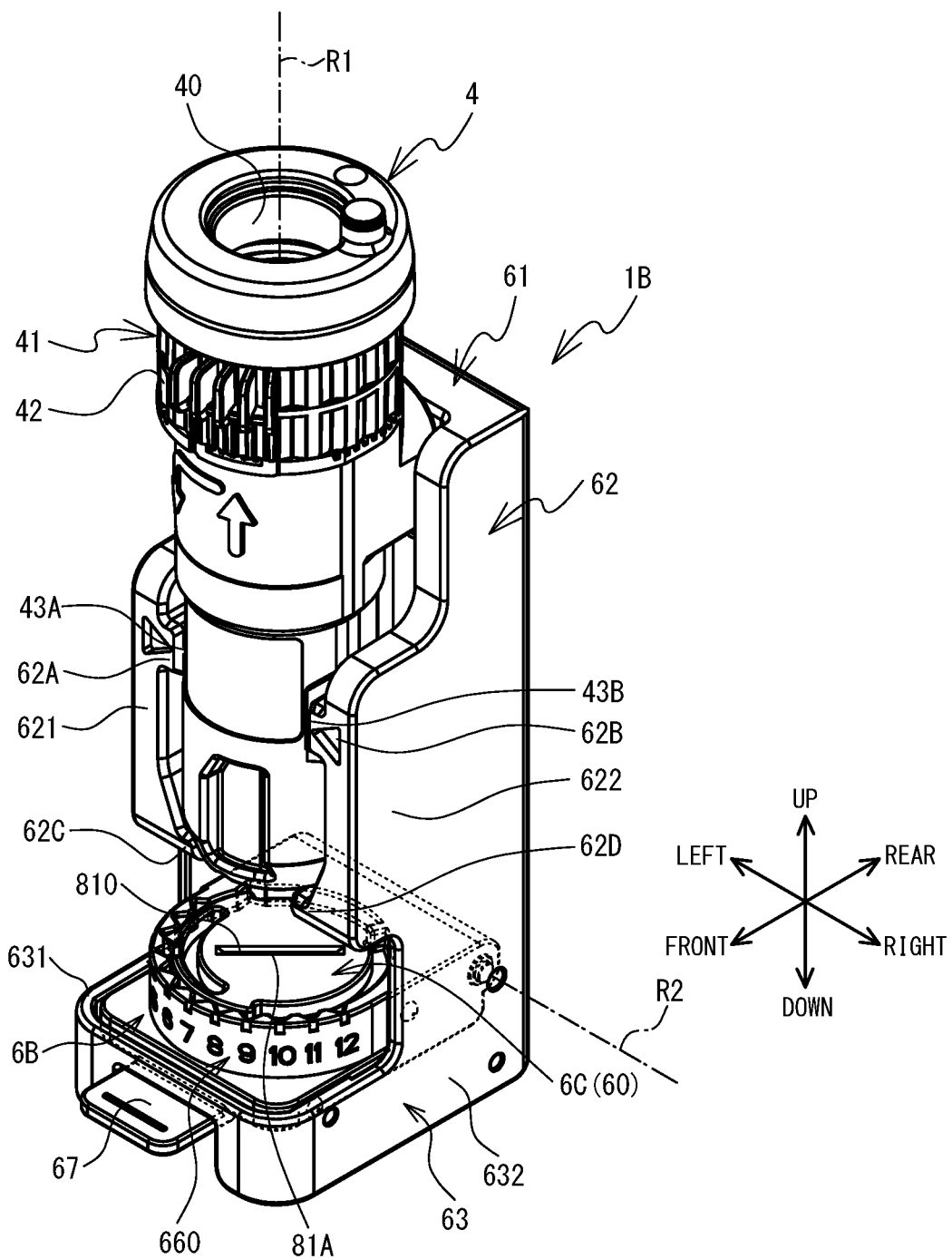
FIG. 18 is a perspective view of the positioning jig to which the cartridge has been fitted.

The cartridge 4 in a state with the pen P not held in the accommodating portion 40 is brought close to the positioning jig 1B from the front. As shown in FIG. 18, the protrusions 62A and 62B of the holding portion 6A of the positioning jig 1B are inserted from the rear through the recessed portions 43A and 43B of the cartridge 4. The cartridge 4 is guided toward the rear in response to the recessed portions 43A and 43B moving along the protrusions 62A and 62B of the positioning jig 1B. The cartridge 4 is held in a state arranged in the space surrounded by the frame 61 and the pair of frames 62 of the holding portion 6A. The protrusions 62A and 62B of the holding portion 6A engage with the recessed portions 43A and 43B of the base portion 41 of the cartridge 4. At this time, the surfaces of the protrusions 62A and 62B orthogonal to the up-down direction face the surfaces of the recessed portions 43A and 43B orthogonal to the up-down direction from the inside. Therefore, the holding portion 6A restricts movement of the cartridge 4 in the direction parallel to the first rotational axis R1, i.e., in the up-down direction. Also, the holding portion 6A supports the lower end of the cartridge 4 from below by the protrusions 62C and 62D, thereby restricting movement of the cartridge 4 downward.

The pen P is inserted through from the upper end of the accommodating portion 40 of the cartridge 4 downward. As shown in FIG. 2, the writing portion Ps of the pen P protrudes downward from the lower end of the base portion 41 of the cartridge 4. The pen P is rotated in the rotational direction Y11 with respect to the cartridge 4 and the positioning jig 1B such that the longitudinal direction of the tip end of the writing portion Ps of the pen P and the extending direction of the recess 81A of the contact portion 6C of the positioning jig 1B match. When the longitudinal direction of the tip end of the writing portion Ps and the extending direction of the recess 81A of the contact portion 6C match, the writing portion Ps enters the recess 81A of the contact portion 6C.

The tip end surface of the writing portion Ps abuts against the bottom surface of the contact surface 810 of the recess 81A of the contact portion 6C of the positioning jig 1B. As a result, the pen P is positioned in the cartridge 4 in the direction parallel to the first rotational axis R1, i.e., in the up-down direction. Also, when the side surface of the writing portion Ps abuts against the inside wall surface of the contact surface 810 of the recess 81A of the contact portion 6C, rotation of the pen P in the rotational direction Y11 (refer to FIG. 2) is restricted. As a result, the pen P is positioned in the cartridge 4 in the rotational direction Y11 about the first rotational axis R1. The dial 42 of the cartridge 4 is operated and the position of the pen P with respect to the cartridge 4 is fixed.

When the pen P is finished being fixed to the cartridge 4, the writing portion Ps of the pen P is inside the recess 81A of the contact portion 6C. Therefore, even if an attempt is made to move the cartridge 4 forward and remove it from the positioning jig 1B, the writing portion Ps will catch on the recess 81A. Therefore, the base portion 6B of the positioning jig 1B is rotated from the set position to the detach position (refer to FIG. 17). As a result, the contact portion 6C is rotated from the first position to the second position. The contact portion 6C no longer intersects the first rotational axis R1, so the writing portion Ps of the pen P comes out of the recess 81A of the contact portion 6C. The cartridge 4 is thus able to move forward with respect to the positioning jig 1B. The cartridge 4 is moved forward from the positioning jig 1B, and detached from the positioning jig 1B.

Operation and Effects of the Present Embodiment

The user using the positioning jig 1B first places the cartridge 4 so that the cartridge 4 is held by the holding portion 6A of the positioning jig 1B (refer to FIG. 18). Then, the user places the pen P in the accommodating portion 40 of the cartridge 4 such that the writing portion Ps of the pen P contacts the recess 81A of the contact portion 6C of the positioning jig 1B (refer to FIG. 2). As a result, the pen P is restricted from rotating about the first rotational axis R1.

Next, the user operates the dial 42 of the cartridge 4 to fix the pen P to the cartridge 4. This completes the positioning of the pen 4P in the rotational direction Y11 with respect to the cartridge 4. Note that the user can position the pen P in a desired orientation with respect to the cartridge 4 by operating the operating portion 6D of the positioning jig 1B and rotating the contact portion 6C. Therefore, the user can easily position the pen P in the rotational direction Y11 with respect to the cartridge 4.

The contact unit 60 is provided with the base portion 6B that rotatably supports the contact portion 6C. The markings [1] to [12] of the scale portion 660 are provided on the curved portion 66A of the base portion 6B. In this case, the user can adjust the orientation of the writing portion Ps of the pen P by referencing the markings [1] to [12] of the scale portion 660.

The base portion 6B has the plurality of recesses 68A. Each of the markings [1] to [12] of the scale portion 660 is provided at a position corresponding to a different one the plurality of recesses 68A. The markings [1] to [12] are arranged in an arc shape centered on the first rotational axis R1. Also, the contact portion 6C has the protrusion 81B that engages with any one of the plurality of recesses 68A. The protrusion 81B functions as a marker indicating the relative positional relationship of the markings [1] to [12] of the base portion 6B. Therefore, the user can easily specify the angle of the contact portion 6C in the rotational direction Y11 with respect to the base portion 6B by aligning the protrusion 81B with the markings [1] to [12].

The base portion 6B has the scale portion 660 and the plurality of recesses 68A corresponding to the markings [1] to [12] of the scale portion 660. The contact portion 6C has the protrusion 81B that engages with any one of the plurality of recesses 68A. In this case, the user can accurately adjust the angle of the contact portion 6C in the rotational direction Y11 with respect to the base portion 6B to the angle corresponding to to the markings [1] to [12] by performing an operation to engage the protrusion 81B with one of the plurality of recesses 68A.

The contact portion 6C has the support portion 81T that supports the protrusion 81B. The support portion 81T elastically deforms in response to the protrusion 81B moving inward in the radial direction centered on the first rotational axis R1. As a result, the support portion 81T applies, to the protrusion 81B, elastic force outward in the radial direction centered on the first rotational axis R1. In this case, the protrusion 81B of the contact portion 6C can be caused to appropriately engage with one of the plurality of recesses 68A of the base portion 6B, and at the same time, the protrusion 81B can be easily disengaged from the plurality of recesses 68A on the base portion 6B when force is applied to the contact portion 6C in the rotational direction Y11. Therefore, the user can easily change between a state in which the recesses 68A and the protrusion 81B are engaged, and a state in which the recesses 68A and the protrusion 81B are disengaged, by operating the operating portion 6D. Consequently, the user can appropriately position the contact portion 6C with respect to the base portion 6B, and at the same time, the user can easily rotate the contact portion 6C with respect to the base portion 6B.

The base portion 6B has the through-hole 69A extending along the first rotational axis R1. The contact portion 6C has the insertion portion 82 to be inserted through the through-hole 69A. The through-hole 69A rotatably supports the insertion portion 82. Therefore, with the positioning jig 1B, the contact portion 6C can be smoothly rotated with respect to the base portion 6B. Also, the first restricting portion 83 of the contact portion 6C restricts the insertion portion 82 from coming out of the through-hole 69A. Therefore, the contact portion 6C can be stably rotated with respect to the base portion 6B.

The protrusions 62A and 62B of the holding portion 6A engage with the recessed portions 43A and 43B of the base portion 41 of the cartridge 4 and thus restrict movement of the cartridge 4 in a direction parallel to the first rotational axis R1, i.e., in the up-down direction. Also, the holding portion 6A supports the lower end of the cartridge 4 with the protrusions 62C and 62D from below and thus restricts movement of the cartridge 4 downward. Therefore, the positioning jig 1B is able to position the pen P with respect to the cartridge 4 in not only the rotational direction Y11, but also in a direction parallel to the first rotational axis R1. Also, with the positioning jig 1B, when the contact portion 6C is in the first position, the pen P can be positioned with respect to the cartridge 4, and when the contact portion 6C is in the second position, the cartridge 4 with the positioned pen P can easily be removed from the contact portion 6C.

The positioning jig 1B is configured such that the holding portion 6A rotatably supports the base portion 6B and the contact unit 60, so the cartridge 4 with the positioned pen P can easily be removed from the holding portion 6A. Also, the second restricting portion 67 restricts rotation of the base portion 6B and the contact unit 60, so the positioning jig 1B enables the contact portion 6C to be easily and stably arranged in the first position.

Modified Examples

The present disclosure is not limited to the embodiments described above. Various modifications are possible. The accommodating portion 40 of the cartridge 4 is not limited to being formed by the through-hole in the base portion 41. For example, the base portion 41 of the cartridge 4 may have a wall portion covering only the rear side and both left and right sides of the pen P. Also, the base portion 41 of the cartridge 4 may have a wall portion covering only both the left and right sides of the pen P. In these cases, the accommodating portion 40 corresponds to the portion covered by the wall portion. In this way, the accommodating portion 40 of the cartridge 4 need not cover the entire pen P in the circumferential direction thereof.

Positioning is performed by the contact portion 6C restricting rotation of the pen P in the rotational direction Y11 with respect to the cartridge 4 by the writing portion Ps of the pen P contacting the inner wall surface of the contact surface 810 that is the inner wall surface of the recess 81A. The contact portion 6C may also restrict rotation of the pen P in the rotational direction Y11 with respect to the cartridge 4 by different method. For example, a protruding portion protruding toward the inside of the recess 81A may be provided on the contact surface 810. The writing portion Ps of the pen P that has entered the recess 81A may contact the tip end of the protruding portion. Also, for example, the contact portion 6C may have two protruding portions protruding upward from the contact body 81, instead of the recess 81A. The writing portion Ps of the pen P may be sandwiched between these two protruding portions. With these, the contact portion 6C may restrict rotation of the pen P in the rotational direction Y11 with respect to the cartridge 4.

The shape of the operating portion 6D may be different from that described above. For example, the contact body 81 of the contact portion 6C may protrude above the upper surface of the support 66 of the base portion 6B. The user may rotate the contact portion 6C with respect to the base portion 6B by directly operating the protruding portion of the contact body 81. In this case, the protruding portion of the contact portion 6C that protrudes above the upper surface of the base portion 6B corresponds to the operating portion 6D. Also, for example, an extension portion extending through the upper side of the base portion 6B from the contact body 81 of the contact portion 6C toward the outside in the radial direction centered on the first rotational axis R1 may be provided. The user may rotate the contact portion 6C with respect to the base portion 6B by operating a tip end portion of the extension portion. In this case, the extension portion corresponds to the operating portion 6D.

The markings [1] to [12] of the scale portion 660 may be provided on the upper surface of the contact body 81 of the contact portion 6C. The scale portion 660 may be arranged along an arc centered on the first rotational axis R1. Also, a marker may be provided at the position of any one of the plurality of recesses 68A of the base portion 6B in order to align the positions of the markings [1] to [12] of the scale portion 660 of the contact portion 6C. The user may rotate the contact portion 6C such that this marker and the positions of the markings [1] to [12] of the scale portion 660 of the contact portion 6C align.

A marker for aligning the positions of the markings [1] to [12] of the scale portion 660 of the base portion 6B may be provided on the contact portion 6C separately from the protrusion 81B. A plurality of recesses may be provided on the contact portion 6C. A protrusion that engages with the plurality of recesses of the contact portion 6C may be provided on the base portion 6B. Alternatively, the plurality of recesses need not be provided on the base portion 6B, and the protrusion need not be provided on the contact portion 6C. In this case, the contact portion 6C may have a circular shape, and may be able to slide with respect to the depressed portion 66B of the base portion 6B.

A support portion that supports the plurality of recesses 68A of the base portion 6B may be provided. This support portion may elastically deform when force is applied in a direction toward the outside in the radial direction centered on the first rotational axis R1. Also, elastic force toward the inside in the radial direction centered on the first rotational axis R1 may be applied to the plurality of recesses 68A in response to the elastic deformation. In this case, the support portion 81T need not be provided on the contact portion 6C.

The base portion 6B may have only the depressed portion 66B and need not have the through-hole 69A. The contact portion 6C need not have the insertion portion 82. In this case, the contact portion 6C may be able to slide while fitted into the depressed portion 66B of the base portion 6B.

The base portion 6B and the contact unit 60 need not be able to rotate with respect to the holding portion 6A. For example, the base portion 6B and the contact unit 60 may be able to move between a state where the contact portion 6C is arranged in the first position, and the third position where the contact portion 6C is slid forward in this state. In this case, the cartridge 4, the pen P, the base portion 6B, and the contact unit 60 may be moved forward as a unit after the pen P is positioned in the rotational direction Y11 with respect to the cartridge 4. Then, the writing portion Ps may be separated from the recess 81A of the contact portion 6C by moving the cartridge 4 to which the pen P is fixed upward with respect to the base portion 6B and the contact unit 60.

The contact portion 6C need not have the second restricting portion 67. Rotation of the base portion 6B and the contact unit 60 with respect to the holding portion 6A may be restricted by only the pair of protrusions 67C of the base portion 6B engaging with the pair of through-holes 63C in the holding portion 6A.

The positioning jig 1B may be integrally formed with the cutting device 1A. The specifics of this are as follows. A sheet having a scale portion where markings [1] to [12] are arranged in an arc shape is held by a positioning portion provided below the head 5 in the opening 91 of the main body cover 9 of the cutting device 1A. The positioning portion can position a sheet having the scale portion with respect to the cartridge 4 mounted to the mounting portion 32. The cartridge 4 with the pen P not fixed thereto is mounted to the mounting portion 32 of the head 5. Next, the pen P is held in the accommodating portion 40 of the cartridge 4. At this time, the direction in which the axis of the pen P extends matches the center of the arc following the arrangement of the markings [1] to [12] of the scale portion. Then, the user rotates the pen P with the direction in which the axis of the pen P extends as the center axis. By doing so, the position of the end portion in the longitudinal direction of the writing portion Ps of the pen P and the position of a marking [1] to [12] desired by the user are adjusted so that they match. Then, the pen P is fixed t to the cartridge 4 by operating the dial 42 of the cartridge 4. In this way, the pen P can be positioned with respect to the cartridge 4 while the cartridge 4 is mounted to the cutting device 1A.

The positioning jig 1B may have only the pair of frames 63 and the frame 64 of the holding portion 6A, and the support 66 of the base portion 6B, and need not have the pair of frames 61 and 62, the contact portion 6C, and the operating portion 6D of the holding portion 6A. In this case, the support 66 is positioned at a set position with respect to the pair of frames 63 of the holding portion 6A by inserting the pairs of protrusions 67A and 67C through the pairs of through-holes 63A and 63C in the holding portion 6A from the inside. That is, the pair of frames 63 of the holding portion 6A position the support 66. Also, the markings [1] to [12] of the scale portion 660 provided on the curved portion 66A of the support 66 are arranged in an arc shape with the first rotational axis R1 as the center axis.

In this case, the user may position the pen P with respect to the cartridge 4 using the positioning jig 1B as follows. The user supports the cartridge 4 with the pen P held in the accommodating portion 40, above the support 66 of the base portion 6B. At this time, the position of the cartridge 4 is adjusted such that the direction in which the axis of the pen P extends matches the first rotational axis R1. Next, the user rotates the pen P with respect to the cartridge 4, with the first rotational axis R1 as the center axis. By doing so, the user adjusts the position of the end portion in the longitudinal direction of the writing portion Ps of the pen P and the position of a marking [1] to [12] desired by the user so that they match. Then, the pen P is fixed to the cartridge 4 by operating the dial 42 of the cartridge 4. In this way, the pen P can be positioned with respect to the cartridge 4.

The fixing method by which the cartridge 4 fixes the pen P is not limited to the embodiments described above. For example, a hole passing through the accommodating portion 40 may be provided in a peripheral wall of the base portion 41 of the cartridge 4. A screw may be able to be attached to this hole from the peripheral wall side toward the side with the accommodating portion 40. The pen P may be fixed to the cartridge 4 by a tip end of the screw that is attached to the through-hole contacting the pen P held in the accommodating portion 40 of the cartridge 4. Alternatively, an adhesive may be interposed between the accommodating portion 40 of the cartridge 4 and the pen P. The pen P may be fixed to the cartridge 4 by the adhesive.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A positioning jig for positioning a pen with respect to a cartridge capable of holding the pen in an accommodating portion, comprising:
   a holding portion holding the cartridge,
   a contact portion including a portion which contacts a writing portion of the pen when the cartridge is held in the holding portion and the pen is held in the accommodating portion, the contact portion being able to rotate about a direction in which an axis of the pen extends, wherein the axis is a first rotational axis, and
   an operating portion for performing an operation to rotate the contact portion,
   wherein the contact portion
      restricts rotation of the pen about the first rotational axis with respect to the contact portion by contacting the writing portion of the pen, and
      positions the pen in a rotational direction about the first rotational axis with respect to the cartridge.

2. The positioning jig according to claim 1, further comprising:
   a base portion rotatably supporting the contact portion,
   wherein at least one of the base portion and the contact portion has a plurality of markings indicating an angle in the rotational direction.

3. The positioning jig according to claim 2, wherein
   the plurality of markings are arranged on the base portion in an arc shape centered on the first rotational axis, and
   the contact portion
      has a circular plate shape centered on the first rotational axis, and is provided with a marker indicating a relative positional relationship with the plurality of markings of the base portion.

4. The positioning jig according to claim 2, wherein
   one of the base portion and the contact portion has the plurality of markings and a plurality of recesses corresponding to the plurality of markings, and
   the other of the base portion and the contact portion has a protrusion engaging with the plurality of recesses.

5. The positioning jig according to claim 4, further comprising:
   a support portion supporting an engaging portion, the engaging portion being at least one of the plurality of recesses and the protrusion,
   wherein the support portion
      elastically deforms when the engaging portion moves in a radial direction centered on the first rotational axis and applies elastic force to the engaging portion.

6. The positioning jig according to claim 2, wherein
   the base portion has a through-hole extending along the first rotational axis, and
   the contact portion has
      an insertion portion to be inserted through the through-hole, and
      a first restricting portion restricting the insertion portion from coming out of the through-hole while the insertion portion is inserted through the through-hole.

7. The positioning jig according to claim 1, wherein
   the holding portion
      restricts movement of the cartridge in a direction parallel to the first rotational axis while holding the cartridge, and
   the contact portion
      is able to move between a first position intersecting the first rotational axis, and a second position not intersecting the first rotational axis.

8. The positioning jig according to claim 7, wherein
   the contact portion
      is able to move between the first position and the second position by rotating about a second rotational axis extending in a direction intersecting the first rotational axis, and
   the contact portion further includes a second restricting portion restricting rotation from the first position to the second position.

* * * * *